United States Patent
White

(10) Patent No.: US 12,333,540 B2
(45) Date of Patent: Jun. 17, 2025

(54) METHOD AND SYSTEM FOR REDUCING A TIME TO AUTHENTICATE A USER

(71) Applicant: Gelliner Limited, Douglas (IM)

(72) Inventor: Brett Andrew White, La Lucia (ZA)

(73) Assignee: Gelliner Limited, Douglas (IM)

( * ) Notice: Subject to any disclaimer, the term of this patent is extended or adjusted under 35 U.S.C. 154(b) by 8 days.

(21) Appl. No.: 17/756,350

(22) PCT Filed: Dec. 4, 2020

(86) PCT No.: PCT/GB2020/053131
§ 371 (c)(1),
(2) Date: May 23, 2022

(87) PCT Pub. No.: WO2021/116667
PCT Pub. Date: Jun. 17, 2021

(65) Prior Publication Data
US 2024/0013216 A1  Jan. 11, 2024

(30) Foreign Application Priority Data

Dec. 12, 2019  (GB) ...................................... 1918343
Jun. 12, 2020  (GB) ...................................... 2008983

(51) Int. Cl.
*G06Q 20/40* (2012.01)
*G06Q 20/20* (2012.01)
*G06Q 20/32* (2012.01)

(52) U.S. Cl.
CPC ....... *G06Q 20/4012* (2013.01); *G06Q 20/206* (2013.01); *G06Q 20/3276* (2013.01)

(58) Field of Classification Search
None
See application file for complete search history.

(56) References Cited

U.S. PATENT DOCUMENTS 10,885,507 B1 *  1/2021  Phillips .............. G06Q 20/4016
2013/0124855 A1 *  5/2013  Varadarajan ............ G07F 19/20
726/4

(Continued)

FOREIGN PATENT DOCUMENTS

TW  M553460  12/2017
WO  2016/059486  4/2016

OTHER PUBLICATIONS

International Searching Authority, International Search Report and Written Opinion mailed on Feb. 8, 2021, issued in connection with International Patent Application No. PCT/GB2020/053131, 9 pages.

(Continued)

*Primary Examiner* — Jamie R Kucab
(74) *Attorney, Agent, or Firm* — McDonnell Boehnen Hulbert & Berghoff LLP

(57) ABSTRACT

A method performed by a session initiation system (SIS) for reducing a time to authenticate a user includes communicating, to a mobile device, session identifying information associated with a session. The mobile device is configured to subsequently communicate at least part of the session identifying information to an authentication server, and the authentication server is configured to subsequently communicate account information associated with the session identifying information to an intermediate gateway. The method also includes receiving, from the intermediate gateway, the account information associated with the session identifying information; and communicating, to the intermediate gateway, a request that specifies the account information, wherein in response to receiving the request, the intermediate gateway is configured to communicate the request to an account server, and wherein the account server is configured to transfer a value amount from a first account specified by the account information to a second account associated with the account server.

20 Claims, 16 Drawing Sheets

(56) References Cited

U.S. PATENT DOCUMENTS

| | | | | |
|---|---|---|---|---|
| 2015/0039517 | A1* | 2/2015 | Liberty | G06Q 20/4012 |
| | | | | 705/67 |
| 2016/0155112 | A1* | 6/2016 | Phillips | G06Q 20/3276 |
| | | | | 235/379 |
| 2016/0300237 | A1* | 10/2016 | Khan | G06Q 20/3223 |
| 2017/0053284 | A1* | 2/2017 | Votaw | G06Q 20/3278 |
| 2017/0308883 | A1* | 10/2017 | Black | G06Q 20/3278 |
| 2019/0287111 | A1* | 9/2019 | Cvetkovich | H04L 9/3226 |
| 2020/0092272 | A1* | 3/2020 | Eisen | H04L 63/0869 |
| 2023/0179589 | A1* | 6/2023 | Kopack | H04L 63/18 |
| | | | | 726/4 |

OTHER PUBLICATIONS

IP Australia; Examination Report No. 1 for standard patent application issued for Australian application No. 2020403634 dated Dec. 15, 2023, 3 pages.

Canadian Intellectual Property Office; Office Action for Canadian application No. 3,163,238 dated Oct. 24, 2024, 5 pages.

European Patent Office; Communication pursuant to Rules 161(1) and 162 EPC issued for European application No. 20829956.0 dated Jul. 19, 2022, 1 page.

European Patent Office; Communication pursuant to Article 94(3) EPC issued for European application No. 20829956.0 dated Dec. 19, 2024, 6 page.

* cited by examiner

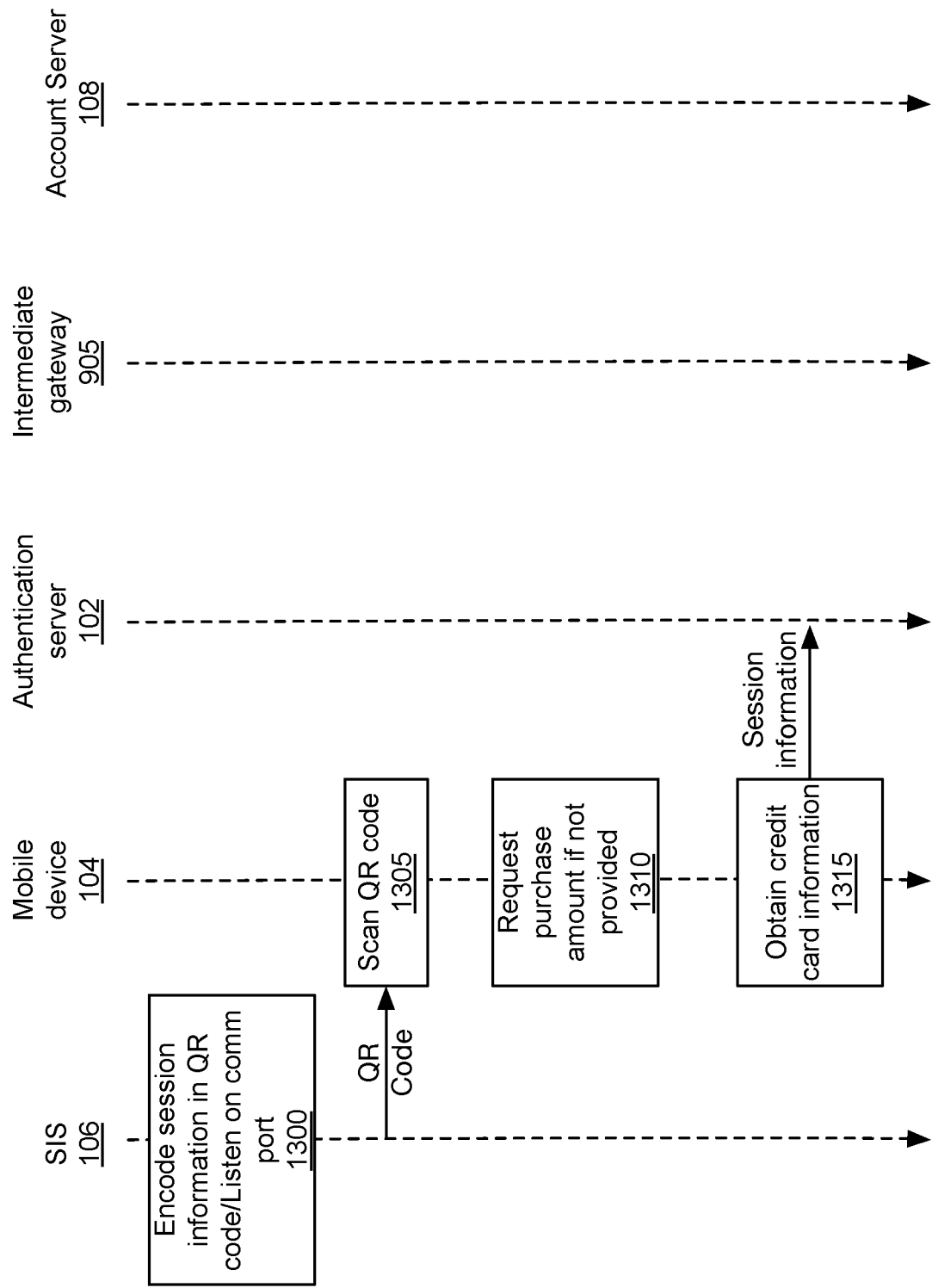

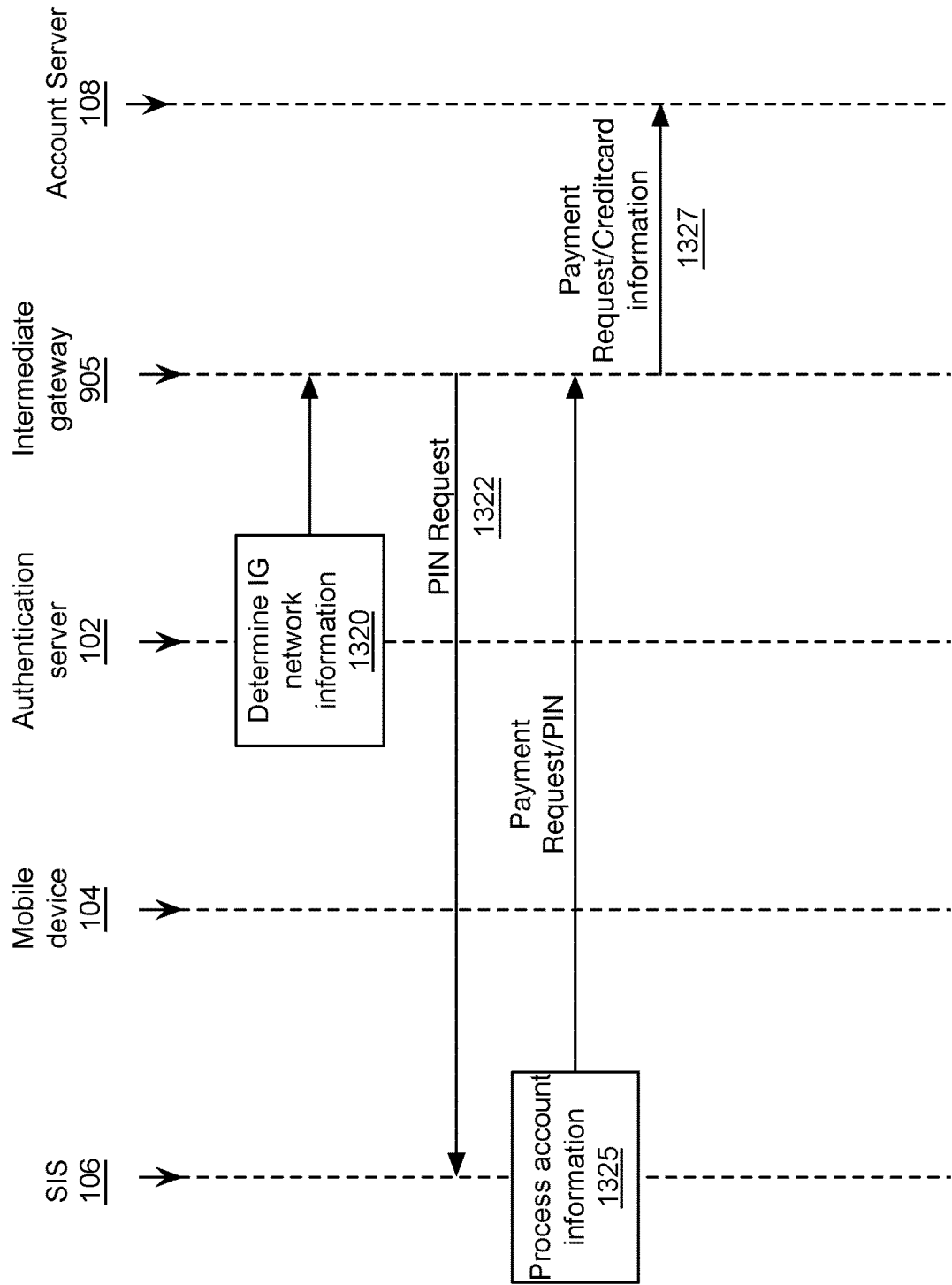

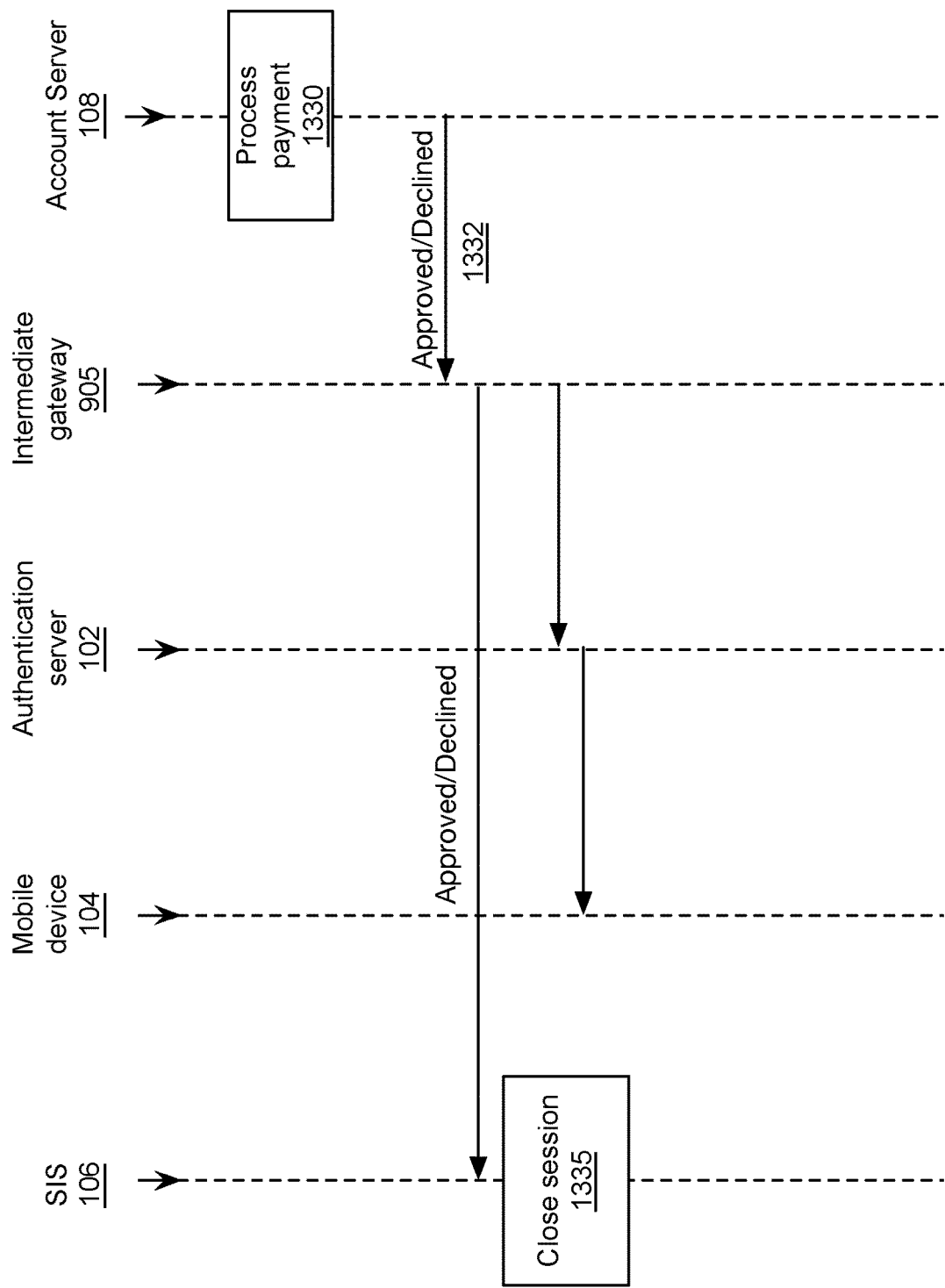

METHOD AND SYSTEM FOR REDUCING A TIME TO AUTHENTICATE A USER

CROSS-REFERENCE TO RELATED APPLICATIONS

This application is a national stage application under 35 U.S.C. § 371 of International Application No. PCT/GB2020/053131, filed Dec. 4, 2020, which claims the benefit of priority from Great Britain Application No. 1918343.3, filed Dec. 12, 2019 and Great Britain Application No. 2008983.5, filed Jun. 12, 2020. The disclosures of all of the above applications are incorporated by reference herein in their entireties.

FIELD

This application generally relates to network communications between servers and client devices. In particular, this application describes a method and system for reducing a time to authenticate a user.

BACKGROUND

Digital information exchange sessions can be a convenient way of establishing relationships between people and/or devices. A desirable feature in such sessions is the ability to confirm that the parties to the digital information exchange sessions are who they assert to be. One way to accomplish this is to provide a way to authenticate the information.

One example where authentication of a digital information exchange session can occur is in the exchange of information between a client device and a server. In this scenario, the client device and server may rely on public and private keys to encrypt and decrypt messages. For example, the client device can request information from the server and can provide a public key to the server that the server can then use to encrypt the information. Upon receiving the encrypted information, the client device can decrypt the encrypted information using a private key that is associated with the public key.

Another example where authentication of a digital information exchange session can occur is in the retail environment. In the retail environment, a customer may present a credit card to a card reader to make a purchase by way of a card swipe or card chip insertion. The card reader may read account information specified on the card and communicate the account information and the purchase amount to a server associated with an acquiring bank. The server can determine that the communicated information is authentic based on the source of information, which in this case would be a card reader registered with the server. After determining that the information is trustworthy, the server of the acquiring bank can request payment for the purchase from an issuing bank (i.e., the bank that issued the credit card to the customer).

The act of retrieving a credit card from a wallet and presenting the card to the card reader can be somewhat inconvenient. In cases where the card reader supports near field communications, paying with a mobile device can be more convenient. Unfortunately, more often than not, such a card reader is unavailable and/or is configured to refuse such a payment method. Moreover, even when such card readers are available, the card reader may be limited to only work with mobile devices that include specialized hardware, such as hardware, to support secure near field communications.

SUMMARY

In a first aspect, a method performed by a session initiation system (SIS) for reducing a time to authenticate a user includes communicating, to a mobile device, session identifying information associated with a session. The mobile device is configured to subsequently communicate session information associated with the session identifying information to an authentication server. The authentication server is configured to subsequently determine, based on the session information, a communication mode associated with an intermediate gateway that facilitates network communications between the authentication server and the intermediate gateway. The method also includes receiving, from the intermediate gateway, the account information associated with the session information; and communicating, to the intermediate gateway, a request that specifies the account information. In response to receiving the request, the intermediate gateway is configured to communicate the request to an account server, and the account server is configured to transfer a value amount from a first account specified by the account information to a second account associated with the account server.

In a second aspect, a system includes a memory that stores instruction code, and a processor in communication with the memory. The instruction code is executable by the processor to cause the processor to perform the method of the first aspect.

In a third aspect, non-transitory computer-readable medium stores instruction code that is executable by a processor of a computer to perform the method of the first aspect.

In a fourth aspect, a computer-readable signal is disclosed. In one embodiment, the signal bears information that facilitates the configuration of the computer to perform a method of the first aspect. The signal may bear information from which instruction code can be read, the instruction code being such that, when executed, the method of the first aspect is performed. The signal can bear information from which instruction code can be read, the instruction code being so as to configure instruction code pre-existing on a computer, to cause that computer to execute the method of the first aspect.

BRIEF DESCRIPTION OF THE FIGURES

The accompanying drawings are included to provide a further understanding of the claims, are incorporated in, and constitute a part of this specification. The detailed description and illustrated examples described serve to explain the principles defined by the claims.

FIG. 13 illustrates operations that can be performed by one or more entities of the environment of FIG. 9 to authenticate digital information exchange sessions based on the communication of a personal identification number (PIN) from the SIS to the account server, in accordance with an example.

DETAILED DESCRIPTION

Figure 1:
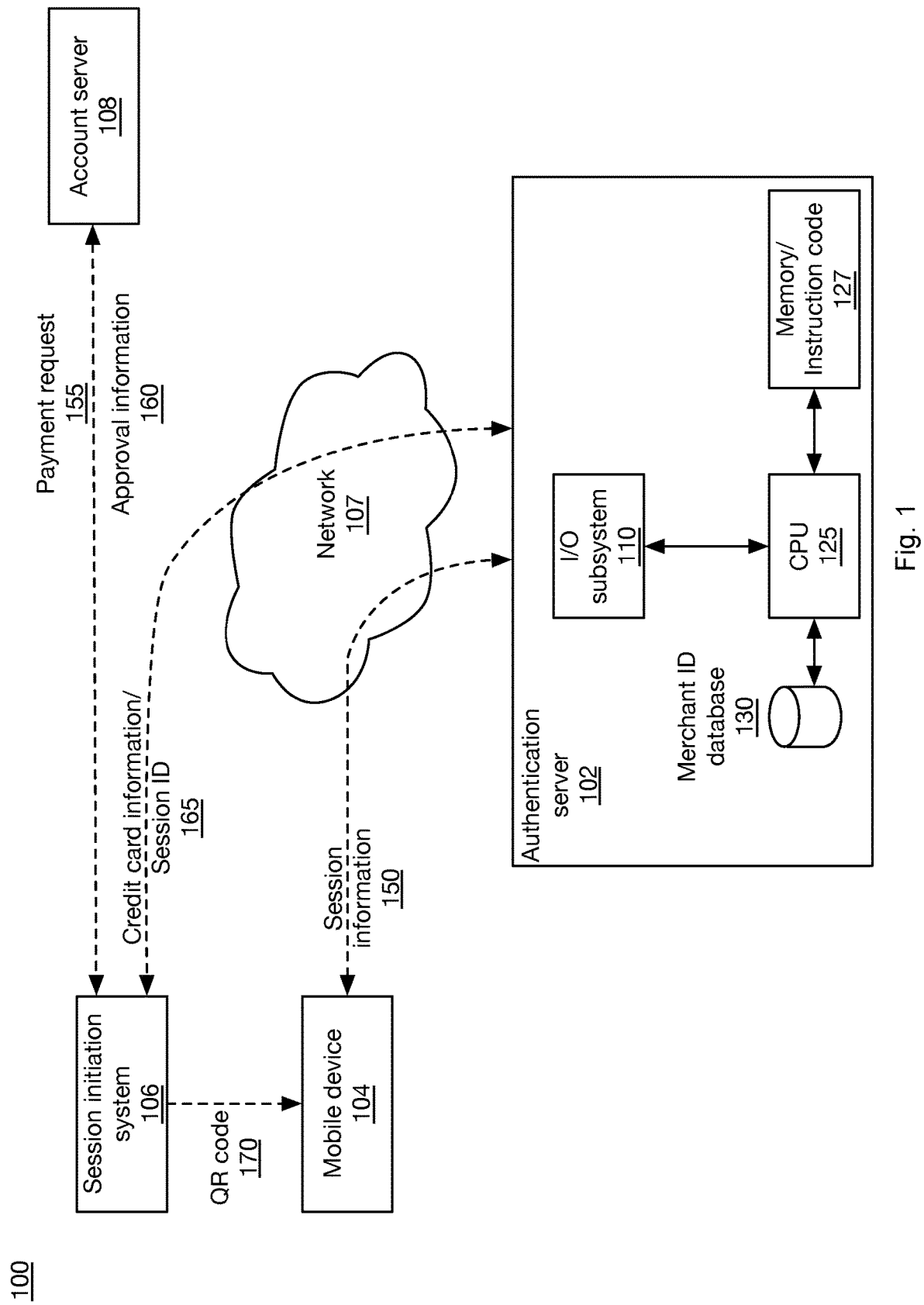
FIG. 1 illustrates an environment that facilitates authentication of a digital information exchange session, in accordance with an example.

Various examples of systems, devices, and/or methods are described herein. Words such as "example" and "exemplary" that may be used herein are understood to mean "serving as an example, instance, or illustration." Any implementation, and/or feature described herein as being an "example" or "exemplary" is not necessarily to be construed as preferred or advantageous over any other embodiment, implementation, and/or feature unless stated as such. Thus, other embodiments, implementations, and/or features may be utilized, and other changes may be made without departing from the scope of the subject matter presented herein.

Accordingly, the examples described herein are not meant to be limiting. It will be readily understood that the aspects of the present disclosure, as generally described herein, and illustrated in the figures, can be arranged, substituted, combined, separated, and designed in a wide variety of different configurations.

Further, unless the context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

Moreover, terms such as "substantially," or "about" that may be used herein, are meant that the recited characteristic, parameter, or value need not be achieved exactly, but that deviations or variations, including, for example, tolerances, measurement error, measurement accuracy limitations and other factors known to those of ordinary skill in the art, may occur in amounts that do not preclude the effect the characteristic was intended to provide.

To the extent that terms "includes," "including," "has," "contains," and variants thereof are used herein, such terms are intended to be inclusive in a manner similar to the term "comprises" as an open transition word without precluding any additional or other elements.

Within the scope of the present disclosure, being "in proximity" could include being within 10 meters, within 5 meters, within 1 meter, within 0.01 meter, etc. For example, a first device could be "in proximity" to a second device if a physical location of the first device is within 10 meters of a known location of the second device. Other relevant "proximate" distances between devices are possible and contemplated.

In the context of this disclosure, account information may comprise financial session information. However, in embodiments of this disclosure, account information may comprise records of any quantifiable entity, such as information regarding the consumption of a physical resource, and/or information regarding a measurable condition.

INTRODUCTION

As noted above, card readers that can accept payment from mobile devices are relatively rare. The few card readers that are available may only operate with mobile devices that include specialized hardware that supports near field communications. When a user attempts to initiate a session with a mobile device that does not include these features, the credit card company associated with the user cannot determine within any industry-accepted degree of certainty whether the user actually initiated the session. In some cases, this may require additional communications between the credit card company and the user to ascertain whether the user actually initiated the session. These additional communications can increase the bandwidth and time required to complete the session and necessarily impact equipment resources as the equipment used in processing the session (e.g., a point of sale device) cannot be used for other sessions until the pending session has reached a final disposition (e.g., session approved/declined). For example, the equipment used for processing sessions may be idled until the session has been completed. Therefore, the utilization efficiency of the equipment is reduced.

Various examples of methods and systems that address these drawbacks are disclosed herein. Generally, the disclosed system allows a user to authenticate a session to within an industry-accepted degree of certainty by merely scanning a QR code presented on a session initiation system (SIS). According to certain examples, the SIS can generate a quick response code (QR code) that encodes information associated with a purchase such as the purchase amount. The QR code can also encode information that specifies a session initiation system identifier (SIS ID) associated with the SIS.

A mobile device with an imager can scan the QR code and communicate account information associated with a credit card and the information encoded in the QR code to an authentication server. The authentication server can then communicate the credit card information received from the mobile device to the SIS. The SIS can then communicate the credit card information to an account server associated with an acquiring bank to complete the session. The account server can consider the session to be a card-present session, which is the equivalent to the customer swiping a credit card in the SIS.

Thus, the requirement for further authentication by the account server is obviated. This, in turn, reduces the overall bandwidth and session time, which necessarily improves the utilization efficiency of the equipment.

First Example Environment

FIG. 1 illustrates an example of an environment 100 that facilitates authentication of a digital information exchange session. Illustrated entities of the environment 100 include an authentication server 102, a mobile device 104, a session initiation system (SIS) 106, and an account server 108. The various entities of the environment 100 can communicate with one another via a network 107, such as the Internet.

The authentication server 102 can include a processor 125 and a memory 127. Another example of the authentication server 102 can include an input/output subsystem (I/O subsystem 110) and a merchant identifier database (merchant ID database 130).

The processor 125 can execute instruction code stored in the memory 127 for coordinating activities performed between the various subsystems of the authentication server 102. As an example, the processor 125 can correspond to a stand-alone processor such as an Intel®, AMD®, or PowerPC® based processor or a different processor. The authentication server 102 can include an operating system, such as Microsoft Windows®, Linux, Unix®, or another operating system that operates on the processor 125. Operations performed by the authentication server 102 are described in further detail below.

The I/O subsystem 110 can include one or more input/output interfaces configured to facilitate communications with entities outside of the authentication server 102. An example of the I/O subsystem 110 can be configured to communicate information over a network such as the Internet or a "Plain Ordinary Telephone Service" (POTS). Another example of the I/O subsystem 110 can be configured to communicate information using a communication methodology such as, for example, a RESTful API or a Web Service API. In some cases, the I/O subsystem 110 can implement a web browser to facilitate generating one or more web-based interfaces through which operators of the authentication server 102 can interact with the authentication server 102.

The merchant ID database 130 can include records that associate merchant IDs (420, FIG. 4) with particular merchants. The records can further associate the merchant IDs 420 with an SIS identifier (SIS ID 405, FIG. 4) that can uniquely identify a particular SIS 106. For example, the SIS ID 405 can correspond to a media access control address (MAC address). In some examples, the merchant IDs 420 can be associated with multiple SIS IDs 405. This may occur where a given merchant has several SISes 106 distributed within a particular establishment or establishments.

An example of the SIS ID 405 can correspond to or be further associated with network information. The network information can specify a communication mode that facilitates network communications between the authentication server 102 and the SIS 106. For example, the network information can specify the communication mode as "Internet" and can further specify a uniform resource locator (URL) and/or an IP address associated with a particular SIS 106. Some examples of the network information can specify the communication mode as "Plain Ordinary Telephone Service" (POTS) and further specify a phone number associated with the SIS 106.

In operation, the authentication server 102 can be configured to receive session information 150 from the mobile device 104. An example of the session information 150 can specify credit card information 165, a merchant ID 420, a session amount, and an SIS ID 405. An example of the authentication server 102 can be configured to extract the SIS ID 405 from the session information 150 and to determine the network information associated with the SIS ID 405. The network information can specify a communication mode that facilitates network communications between the authentication server 102 and the SIS 106. The network information can specify a URL, IP address, phone number, or other information that can uniquely identify the SIS 106. In some examples, the SIS ID 405 specifies the network information. In other examples, the authentication server 102 can be configured to search the merchant ID database 130 for a record associated with a merchant ID and/or the SIS ID 405, and the record specifies the network information.

After determining the network information, the authentication server 102 can be configured to communicate credit card information 165 and other the information specified in the session information 150 to the SIS 106 via the communication mode specified in the network information.

Figure 2:
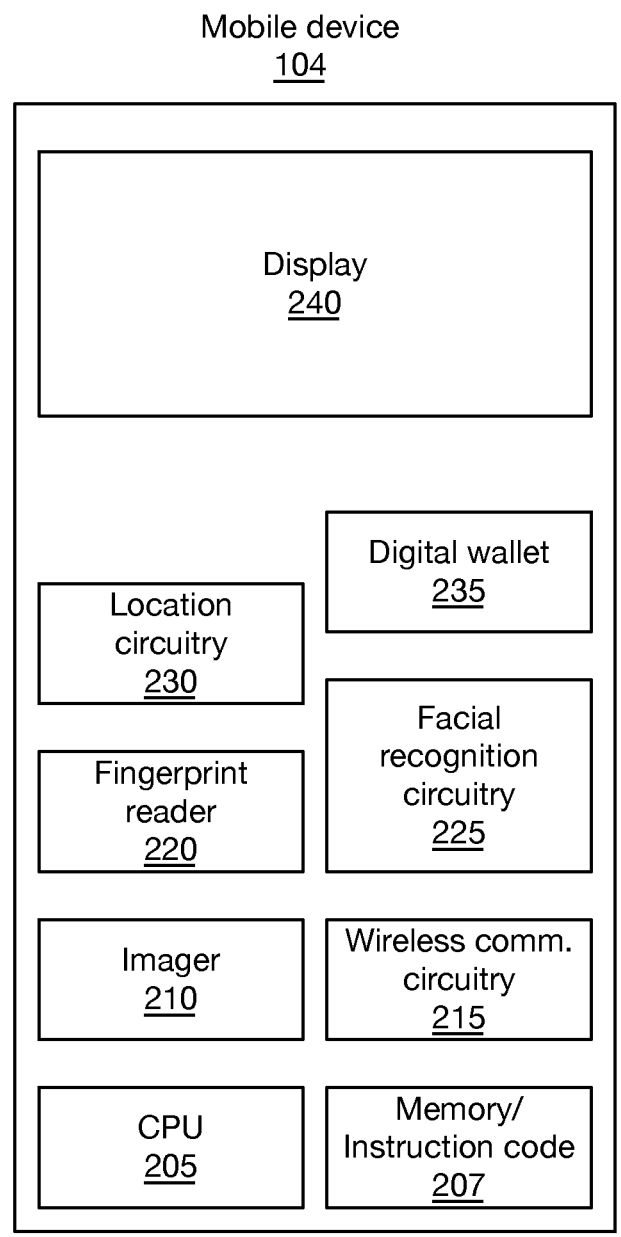
FIG. 2 illustrates a mobile device of the environment, in accordance with an example.

FIG. 2 illustrates an example of the mobile device 104. Referring to FIG. 2, the mobile device 104 can correspond to a device such as a smartphone, tablet, portable computer, a smartwatch, or a different portable device. In this regard, an example of the mobile device 104 can include a display 240, a processor 205, and a memory 207. The memory 207 can store instruction code executed by the processor 205 to control the mobile device 104 to perform various functions of the mobile device 104.

An example of the mobile device 104 can include an imager 210 and wireless communication circuitry 215. The imager 210 can work in conjunction with an application operating on the mobile device 104 for scanning an image. In an example, the imager 210 and the application can be configured to scan a quick response code (QR code 170) and decode information encoded within the QR code 170. Details of the QR code 170 are discussed below.

An example of the mobile device 104 can include a digital wallet 235 that stores encrypted credit card information 165. The encrypted credit card information 165 can include an account number associated with an issuing bank, a card verification code (CVC), a name associated with the account number, and an expiration date. Some examples of the credit card information 165 can include or specify a personal identification number (PIN). It will be understood that other types of encrypted credit card information 165 are possible and contemplated.

The wireless communication circuitry 215 is configured to facilitate communicating information to and from the mobile device 104. An example of the wireless communication circuitry 215 can include cellular telephone communication circuitry configured to communicate information over a cellular telephone network such as a 3G, 4G, and/or 5G network. Other examples of the wireless communication circuitry 215 can communicate information over an 802.11 based network, Bluetooth®, Zigbee®, or a different wireless network. In some examples, the wireless communication circuitry 215 can communicate information using near field communication technology.

An example of the mobile device 104 can include circuitry for authenticating a user of the mobile device 104. For example, the mobile device 104 can include a fingerprint reader 220 configured to scan a fingerprint of the user to confirm the identity of the user. The mobile device 104 can include facial recognition circuitry 225 configured to scan the user's face and confirm the identity of the user. In some examples, the mobile device 104 can authenticate the user based on a password or personal identification number (PIN) specified by the user via the user interface of the mobile device 104.

The mobile device 104 can include location circuitry 230, such as global positioning system circuitry (GPS circuitry) configured to determine the geographic location of the mobile device 104. In this regard, the location circuitry 230 can operate in conjunction with the wireless communication circuitry 215 and an application operating on the mobile device 104 to determine a physical address associated with the mobile device 104. An example of the physical address can correspond to a street address. Another example of the physical address can correspond to a place of business, such as a particular restaurant, grocery store, etc.

Figure 3:
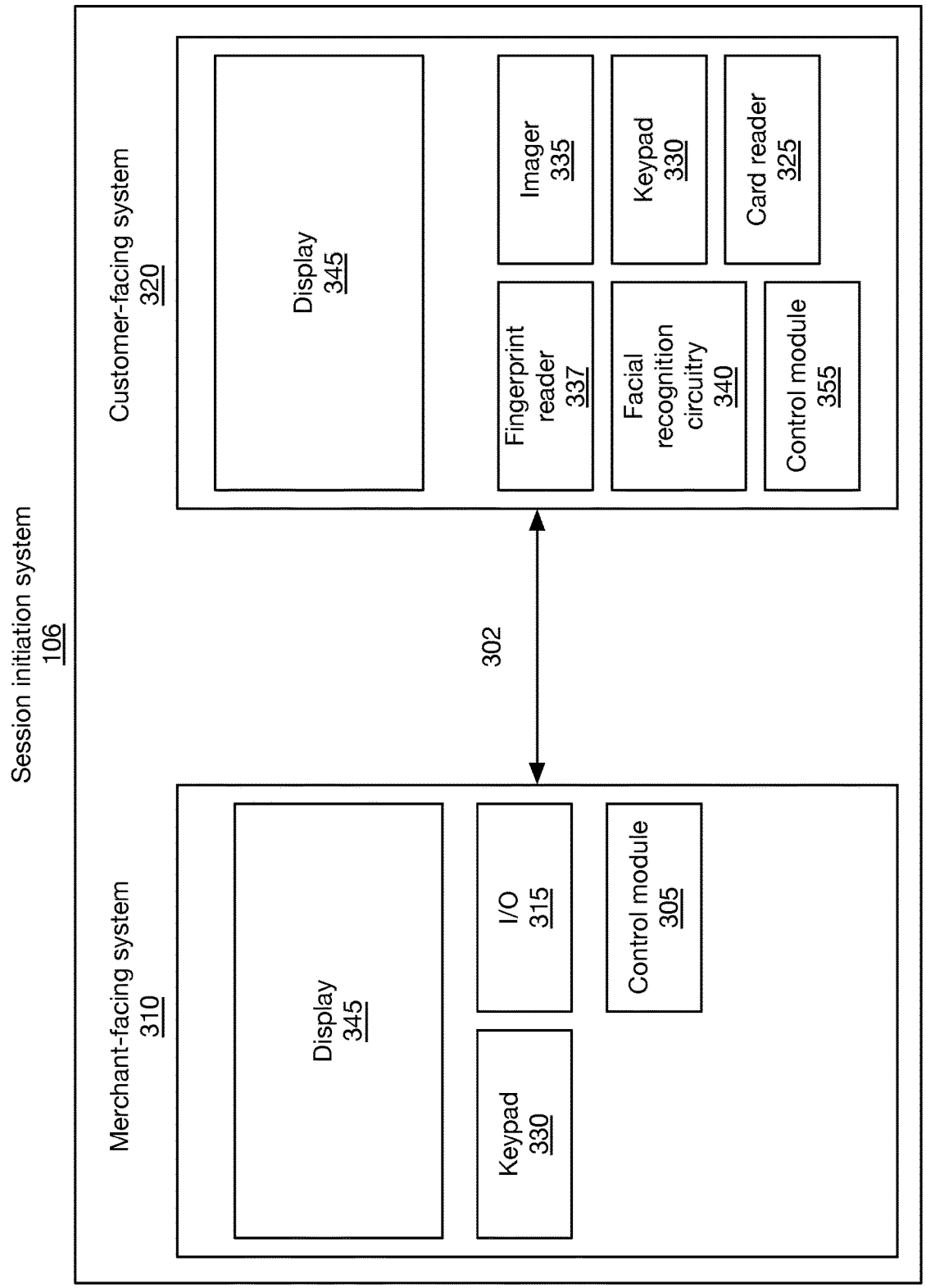
FIG. 3 illustrates a session initiation system (SIS) of the environment, in accordance with an example.

FIG. 3 illustrates an example of the SIS 106. Referring to FIG. 3, the SIS 106 can include a merchant-facing system 310 and a customer-facing system 320. An example of the merchant-facing system 310 and the customer-facing system 320 can be integrated within a unified housing. In another example, the merchant-facing system 310 and the customer-facing system 320 can be arranged within separate housings. The merchant-facing system 310 and the customer-facing system 320 can communicate information via a link 302, which can be wired or wireless. For example, the merchant-facing system 310 can communicate an amount associated with a session to the customer-facing system 320. While various operations are described below as being performed by the SIS 106, it is contemplated that the operations could be performed by the merchant-facing system 310, the customer-facing system 320, or a combination of the two.

The merchant-facing system 310 can correspond to a computer system configured to process payments at a retail store, a restaurant, etc. An example of the merchant-facing system 310 can correspond to a point of sale (POS) device. In this regard, the merchant-facing system 310 can include a control module 305 that includes a processor and a memory that stores instruction code executable by the processor to facilitate performing various payment processing operations. Within examples, these operations can include the specification of goods and services being purchased by a customer, determining the cost and tax associated with the goods and services, etc. Other operations described in additional detail below can be performed by the merchant-facing system 310.

An example of the merchant-facing system 310 can include a keyboard/keypad 330 and a display 345 (or touch-sensitive display), and/or other devices that facilitate specifying payment processing operations by an operator of the merchant-facing system 310.

An example of the merchant-facing system 310 can include an input/output (I/O) subsystem 315. The I/O subsystem 315 can include one or more input/output interfaces configured to facilitate communications with entities outside of the SIS 106. An example of the I/O subsystem 315 can be configured to communicate information over a network such as the Internet or a "Plain Ordinary Telephone Service" (POTS). Another example of the I/O subsystem 315 can be configured to communicate information using a communication methodology such as, for example, a RESTful API or a Web Service API. In some cases, the I/O subsystem 315 can implement a web browser to facilitate generating one or more web-based interfaces through which users of the SIS 106 can operate the SIS 106.

An example of the customer-facing system 320 can correspond to a pin entry device (PED). In this regard, the customer-facing system 320 can include a control module 355 that includes a processor and a memory that stores instruction code executable by the processor to facilitate performing various payment processing operations. Within examples, these operations can include the presentation of a list of goods and services being purchased by a customer, presentation of the cost and tax associated with the goods and services, presentation of a QR code that facilitates processing the exchange session via a mobile device 104, etc. Other operations described in additional detail below can be performed by the customer-facing system 320.

An example of the customer-facing system 320 can include a card reader 325, a keypad 330, and a display 345. The card reader 325 can be configured to read information stored on a credit card. In this regard, examples of the card reader 325 can include a magnetic strip reader, a chip reader, and/or a wireless reader. The keypad 330 can be configured to facilitate entry of customer authentication information associated with a credit card or a debit card, such as a personal identification number (PIN) and/or a password associated with the credit card or a debit card. In some examples, the customer-facing system 320 can include an imager 335 that works in conjunction with an application operating on the customer-facing system 320 for scanning, for example, a QR code generated by the mobile device 104 that encodes the authentication information. In some examples, the customer-facing system 320 can include a fingerprint reader 337 and/or facial recognition circuitry 340 that facilitates authenticating the customer based on a fingerprint and/or facial features of the customer.

In operation, the customer-facing system 320 can be configured to present information on the display 345, such as the cost for each of the goods and/or services purchased, the total cost of goods and services, the sales tax, and/or the total amount owed. In an example, the display 345 can present a matrix barcode such a QR code 170 that is readable by, for example, the imager 210 of the mobile device 104. The QR code 170 can be configured to encode information related to the session occurring between the merchant and the customer.

Figure 4:
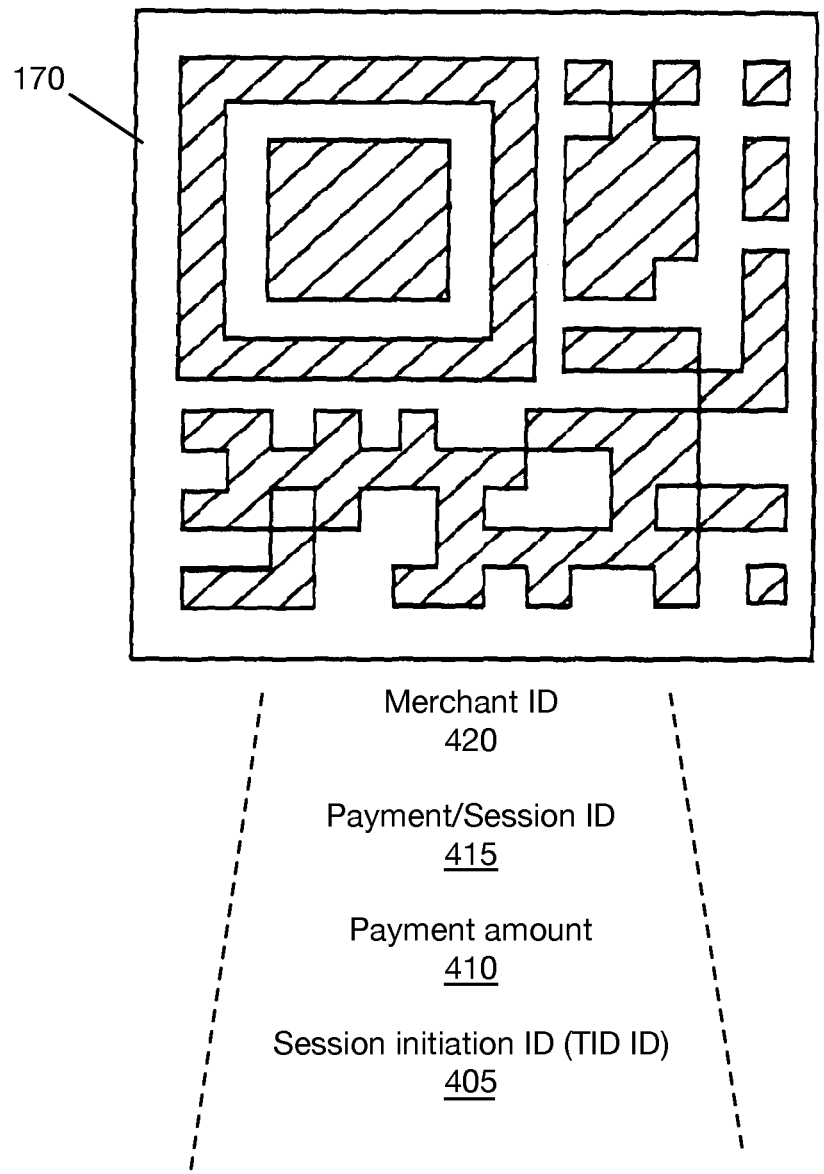
FIG. 4 illustrates a QR code, in accordance with an example.

FIG. 4 illustrates an example of a QR code 170. The QR code 170 corresponds to a type of matrix/two-dimensional machine-readable barcode that encodes information. In this regard, QR code 170 can depict black squares arranged in a square grid on a white background, which can be read by an imaging device such as a camera, and processed using Reed-Solomon error correction until the image can be appropriately interpreted. An example of the QR code 170 can encode a merchant ID 420, payment/session ID 415, a payment amount 410, and an SIS ID 405.

An example of the SIS ID 405 can specify a communication mode that facilitates network communications between the authentication server 102 and the SIS 106. For example, the network information can specify the communication mode as "Internet" and can further specify a uniform resource locator (URL) and/or an IP address associated with a particular SIS 106. Some examples of the network information can specify the communication mode as "Plain Ordinary Telephone Service" (POTS) and further specify a phone number associated with the SIS 106.

An example of the QR code 170 can be a static image. In this case, the QR code 170 does not change based on information associated with the session being processed on the SIS 106 at a particular time. For example, a static QR code 170 can encode a merchant ID 420 and an SIS ID 405, but not a payment/session ID 415 and a payment amount 410.

Another example of the QR code 170 can be dynamically generated. In this case, QR code 170 can change based on information associated with the session being processed on the SIS 106 at a particular time. For example, a dynamic QR code 170 can encode a merchant ID 420, an SIS ID 405, a payment/session ID 415, and a payment amount 410 associated with a particular session.

Figure 5:
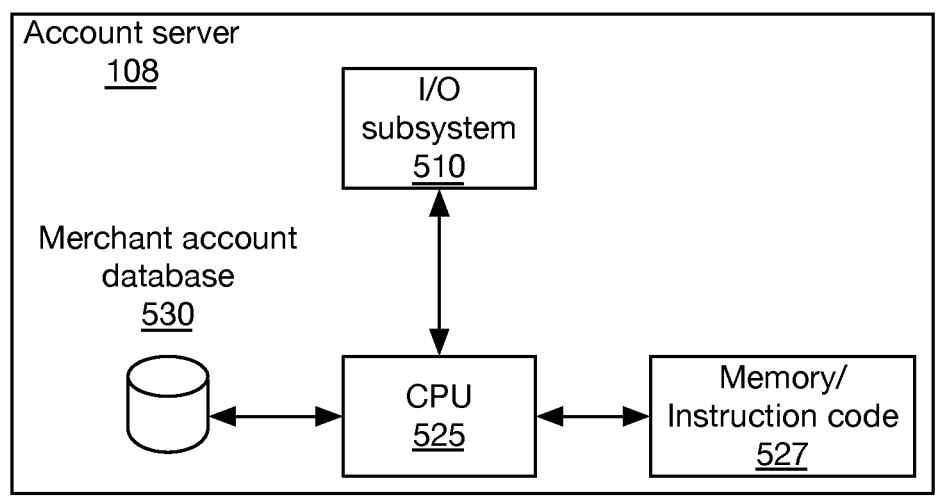
FIG. 5 illustrates an account server of the environment, in accordance with an example.

FIG. 5 illustrates an example of the account server 108. The account server 108 can include a processor 525, a memory device 527, and an I/O subsystem 510. An example of the account server 108 can include a merchant account database 530.

The processor 525 executes instruction code stored in the memory device 527 for coordinating activities performed between the various subsystems of the account server 108. As an example, the processor 525 can correspond to a stand-alone processor such as an Intel®, AMD®, or PowerPC® based processor or a different processor. The account server 108 can include an operating system, such as Microsoft Windows®, Linux, Unix®, or another operating system that operates on the processor 525. Operations performed by the account server 108 are described in further detail below.

The I/O subsystem 510 can include one or more input/output interfaces configured to facilitate communications with entities outside of the account server 108. An example of the I/O subsystem 510 can be configured to communicate information over a network such as the Internet or a "Plain Ordinary Telephone Service" (POTS). Another example of the I/O subsystem 510 can be configured to communicate information using a communication methodology such as, for example, a RESTful API or a Web Service API. In some cases, the I/O subsystem 510 can implement a web browser to facilitate generating one or more web-based interfaces through which users of the account server 108 can operate the account server 108.

An example of the account server 108 can be operated by a financial institution, such as an acquiring bank, which processes credit card or debit card payments on behalf of the merchant. In this regard, the acquiring bank can allow the merchant to accept credit card payments from one or more card-issuing banks within an association such as Visa, MasterCard, Discover, etc. The acquiring bank may have entered into a contract with the merchant and may provide the merchant with an account. The acquiring bank can exchange funds with issuing banks (i.e., banks that issue credit/debit cards) and compensate the merchant accordingly.

The merchant account database 530 can include records that associate merchant IDs 420 with accounts. The accounts may be used for receiving and sending funds associated with merchants. The records can further associate the merchant IDs 420 with one or more SIS IDs 405. As noted above, the SIS ID 405 can uniquely identify a particular SIS 106. For example, the SIS ID 405 can correspond to a MAC address, a uniform resource locator (URL), an IP address, a phone number, or a different type of identifier.

In operation, the account server 108 can be configured to receive a payment request 155. The payment request 155 can specify a merchant or merchant ID 420, customer account information, and a session amount. An example of the payment request 155 can further specify an SIS ID 405.

After receiving the payment request 155, the account server 108 can be configured to search the merchant account database 530 for a record that associates the merchant and/or the merchant ID 420 with a merchant account. The account server 108 can be further configured to determine an issuing bank from the account information and request a transfer of funds from the issuing bank to the merchant account.

An example of the account server 108 can be further configured to determine a session fee for facilitating the transfer of funds and to deduct the determined session fee from the merchant account. In this regard, the session fee deducted by the account server 108 can depend on the source of the payment request 155. For example, the account server 108 can be configured to deduct a higher session fee (e.g., 3.2% of funds transferred) for payment requests 155 received from online retailers (i.e., card-not-present transaction) and a lower session fee (e.g., 3.0% of funds transferred) for payment requests 155 received from an SIS 106 (i.e., card-present session). The lower session fee may be charged for payment requests 155 received from an SIS 106 because such sessions can be considered to be less likely to be fraudulent.

After processing the payment request 155, the account server 108 can be configured to communicate approval information 160 to the source of the payment request 155. For example, the approval information 160 can be provided to an online retailer or a merchant SIS 106.

Figure 6:
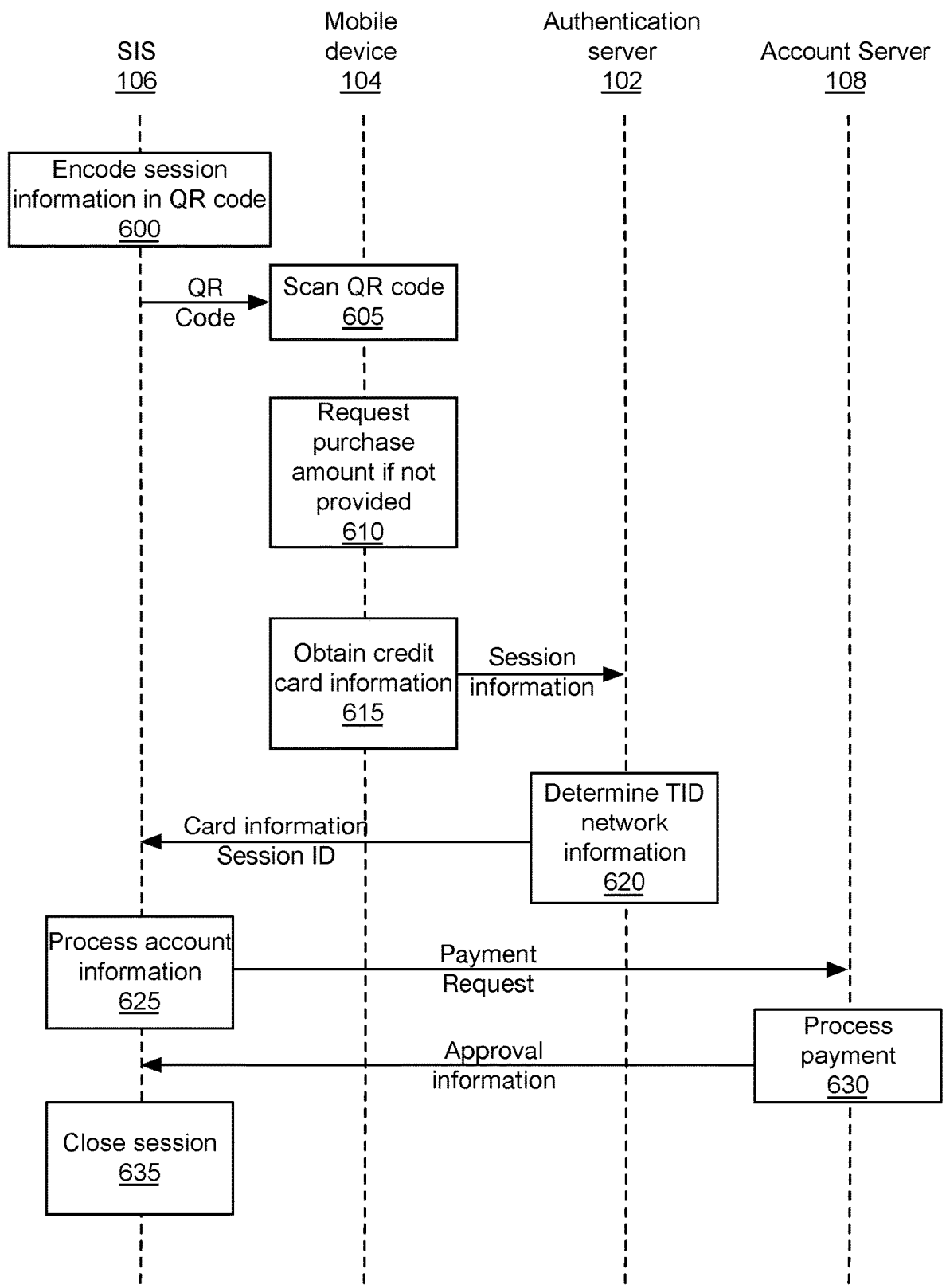
FIG. 6 illustrates operations that can be performed by one or more entities of the environment to authenticate a digital information exchange session, in accordance with an example.

FIG. 6 illustrates an example of operations that can be performed by one or more entities of the environment 100 to authenticate digital information exchange sessions. In this regard, one or more of the entities can store instruction code in respective memories of the entities that can be executed by respective processors of the entities to control the entities to perform one or more of the operations.

At operation 600, a QR code 170 can be generated by the SIS 106. In this regard, the SIS 106 can encode information associated with a session such as a merchant ID 420, a payment/session ID 415, and an SIS ID 405 within the QR code 170. In some examples, the SIS 106 can encode a payment amount 410 associated with the session. After generating the QR code 170, the SIS 106 can present the QR code 170 to a customer via, for example, the customer-facing system 320 of the SIS 106.

At operation 605, the mobile device 104 can scan the QR code 170. For example, the mobile device user can launch an application on the mobile device 104 configured to read the QR code 170. For example, the application can determine whether the merchant ID 420, payment/session ID, and/or the SIS ID 405 are specified. In some examples, if one or more items of information are not specified, the application can reject the QR code 170 for being malformed and alert the user.

At operation 610, the mobile device 104 can determine whether a payment amount 410 is encoded within the QR code 170. When the payment amount 410 is not specified, the application can request that the user of the mobile device 104 specify the payment amount 410.

At operation 615, the mobile device 104 can obtain credit card information 165. The credit card information 165 can include an account number associated with an issuing bank, a card verification code (CVC), a name associated with the account number, and an expiration date. Some examples of the credit card information 165 can include a PIN. An example of the mobile device 104 can include a secure wallet application that provides access to encrypted credit card details stored on the mobile device 104. In some examples, the user of the mobile device 104 can specify the credit card to use with the session.

After obtaining the credit card information 165, the mobile device 104 can communicate session information 150 to the authentication server 102. The session information 150 can include the credit card information 165, the merchant ID 420, the session amount, and the SIS ID 405. In some examples, the session information 150 can include a payment/session ID. In some examples, the session information 150 can be supplemented with a user ID associated with the user of the mobile device 104.

At operation 620, the authentication server 102 can receive the session information 150 from the mobile device 104. The authentication server 102 can then extract the SIS ID 405 from the session information 150 to determine the network information associated with the SIS ID 405. The network information can specify the communication mode and a URL, IP address, phone number, or another identifier that can uniquely identify the SIS 106. In some examples, the SIS ID 405 specifies the network information. In other examples, the authentication server 102 can search the merchant ID database 130 for a record associated with the merchant ID 420 and/or the SIS ID 405 that specifies the network information.

After determining the network information, the authentication server 102 can communicate some or all of the session information 150 to the SIS 106 via the communication mode specified by the network information. For example, the authentication server 102 can communicate the credit card information 165 and the payment/session ID 415. In some examples, the authentication server 102 can further communicate the merchant ID 420, the payment amount 410, and the SIS ID 405.

At operation 625, the SIS 106 can process the credit card information 165 and the payment/session ID. For example, the SIS 106 can search for the session associated with the payment/session ID 415. The SIS 106 can then set a flag associated with the session to indicate "Card Information Received." The SIS 106 can then communicate a payment request 155 to the account server 108. The payment request 155 can specify a merchant or merchant ID 420, credit card information 165, and a payment amount 410.

At operation 630, the account server 108 can receive the payment request 155. After receiving the payment request 155, the account server 108 can be configured to search the merchant account database 530 for a record that associates the merchant and/or the merchant ID 420 with a merchant account. The account server 108 can determine an issuing bank from the account information and request a transfer of funds from the issuing bank to the merchant account.

An example of the account server 108 can determine a session fee for facilitating the transfer of funds and can deduct the session fee from the merchant account. The session fee can correspond to the lower session fee described above.

After processing the payment request 155, the account server 108 can communicate approval information 160 to the source of the payment request 155. For example, the approval information 160 can be communicated to the SIS 106 from which the payment request 155 was received.

At operation 635, upon receiving the approval information 160, the SIS 106 can set a flag associated with the session to indicate "Payment Received" and close the session.

Other example operations can be performed by one or more entities of the environment 100 to authenticate a digital information exchange session. For example, an example of the SIS 106 can communicate a confirmation message to the authentication server 102 to indicate payment was received. The authentication server 102 can, in turn, communicate the confirmation message or a portion of the confirmation message to the mobile device 104. The confirmation message can specify the amount of funds withdrawn from the credit card account and the date of the session. Some examples of the confirmation message can specify the items purchased.

Another example of the SIS 106 can request further authentication from the mobile device 104 before communicating the payment request to the account server 108 and/or closing the session. For example, the SIS 106 can request further authentication after receiving the credit card information 165 from the authentication server 102.

One example of further authentication can involve requesting the user to enter a PIN or password associated with the credit card on the keypad 330 of the customer-facing system 320 of the SIS 106. The SIS 106 can then confirm that the PIN and/or password is correct before communicating the payment request 155 to the account server 108.

Another example of further authentication can involve fingerprint reading. For example, the fingerprint reader 220 of the mobile device 104 can obtain fingerprint data associated with the mobile device user. The fingerprint data can be encrypted and communicated to the authentication server 102 in the session information 150. The authentication server 102 can then communicate the encrypted fingerprint data to the SIS 106. The SIS 106 can then request the customer to place the same finger on the fingerprint reader 337 of the SIS 106. The SIS 106 can then confirm that the fingerprint read at the SIS 106 matches the fingerprint read by the mobile device to further authenticate the session. If authentication is successful, the SIS 106 can communicate the payment request 155 to the account server 108.

Another example of further authentication can involve facial recognition. For example, the facial recognition circuitry 225 of the mobile device 104 can obtain facial image data associated with the mobile device user. The facial image data can be encrypted and communicated to the authentication server 102 in the session information 150. The authentication server 102 can then communicate the facial image data to the SIS 106. The SIS 106 can then perform facial recognition of the customer via the facial recognition circuitry 340 of the SIS 106. The SIS 106 can then confirm that the facial image data obtained at the SIS 106 matches the facial image data obtained by the mobile device to further authenticate the session. If authentication is successful, the SIS 106 can communicate the payment request 155 to the account server 108.

Another example of further authentication can involve confirming the physical address of the mobile device. For example, the location circuitry 230 of the mobile device 104 can obtain the physical address of the mobile device 104. The physical address can be communicated to the authentication server 102 in the session information 150. The authentication server 102 can then communicate the physical address to the SIS 106. The SIS 106 can then confirm that the physical address associated with the SIS 106 matches the physical address obtained by the mobile device 104 to further authenticate the session. If authentication is successful, the SIS 106 can communicate the payment request 155 to the account server 108.

An example of the physical address can correspond to a street address. Another example of the physical address can correspond to a place of business, such as a particular restaurant, grocery store, etc.

In another example, the QR code 170 can be a static image. That is, the QR code 170 is not generated by the SIS 106 in response to any particular session between customers and the merchant, as is the case in operation 600. In this case, the QR code 170 may not encode a payment amount 410 and a payment/session ID 415. To address this scenario, the SIS 106 can be configured to prevent further sessions from being performed on the SIS 106 until after the pending session has been completed.

Figure 7:
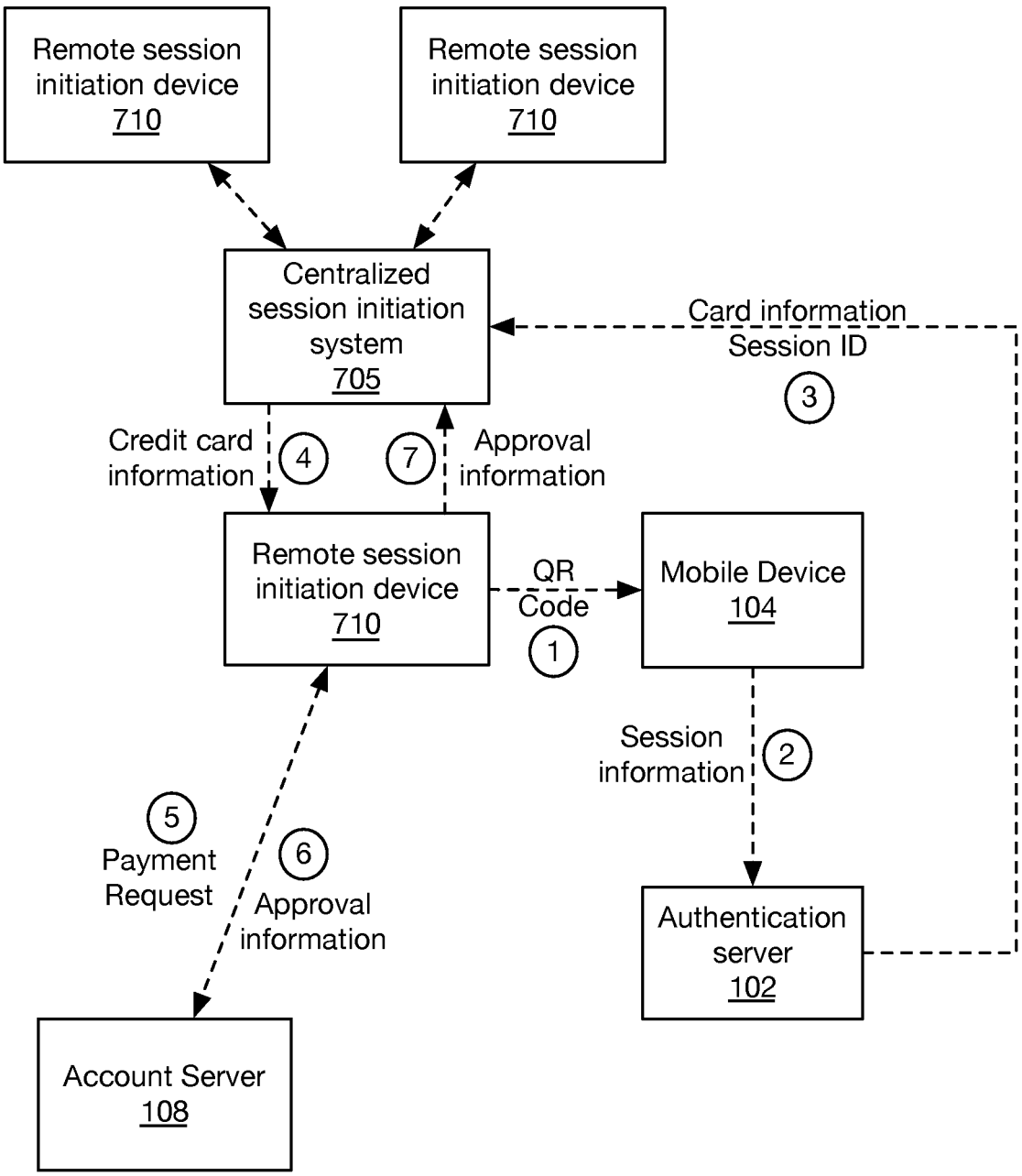
FIG. 7 illustrates an environment in which a centralized SIS can reconcile sessions initiated from one or more remote SISes, in accordance with an example.

FIG. 7 illustrates an example environment where a particular establishment can utilize a centralized SIS 705 to reconcile sessions initiated from one or more remote SISes 710 that are in networked communication with the centralized SIS 705. The order in which information flows between entities of the environment is indicated by the circled numerical references.

Referring to FIG. 7, a remote SIS 710 can encode within the QR code 170 information, such as a merchant ID 420, a payment/session ID 415, a payment amount 410, and an SIS ID 405. A user can use a mobile device 104 to scan the QR code 170, and the mobile device 104 can communicate the corresponding session information 150 to the authentication server 102.

In this scenario, the SIS ID 405 in the session information 150 can refer to the centralized SIS 705 rather than the remote SIS 710. Therefore, the authentication server 102 can communicate some or all of the credit card information 165 and session ID to the centralized SIS 705. The centralized SIS 705 can, in turn, communicate the credit card information 165 to the remote SIS 106 associated with the session ID. The remote SIS 710, in turn, can communicate a payment request 155 to the account server 108. Upon receiving approval, the remote SIS 710 can indicate to the centralized SIS 705 that the payment request 155 was approved. The centralized SIS 106 can then flag the session as being completed.

Figure 8:
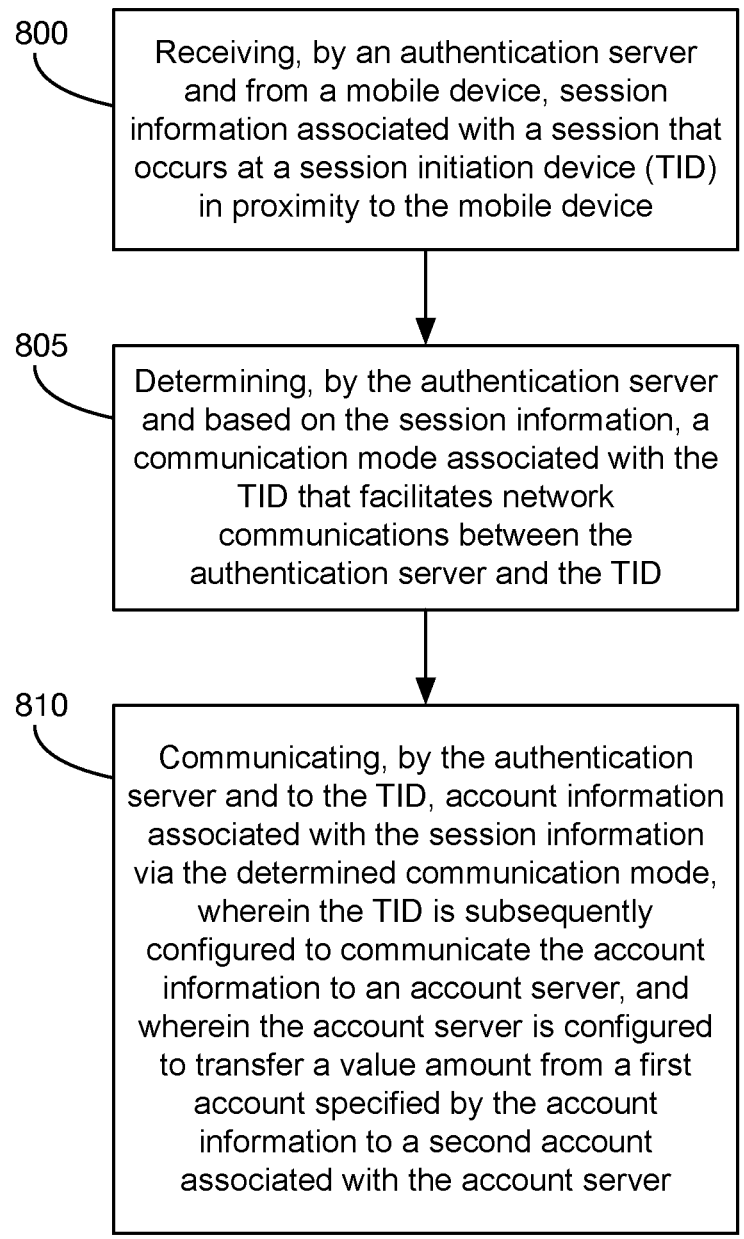
FIG. 8 illustrates a computer-implemented method, in accordance with an example.

FIG. 8 illustrates a computer-implemented method that can be implemented in the environment of FIG. 100. Block 800 can involve receiving, by an authentication server 102 and from a mobile device 104, session information 150 associated with a session that occurs at a session initiation system (SIS 106) in proximity to the mobile device 104.

Block 805 can involve determining, by the authentication server 102 and based on the session information 150, a communication mode associated with the SIS 106 that facilitates network communications between the first server and the SIS 106.

Block 810 can involve communicating, by the authentication server 102 and to the SIS 106, account information associated with the session information 150 via the determined communication mode, wherein the SIS 106 is subsequently configured to communicate the account information to an account server 108 to complete the session, and wherein the account server is configured to transfer a value amount from a first account specified by the account information to a second account associated with the account server.

In some examples, the session information 150 is associated with an SIS ID 405 that is read by the mobile device 104, wherein the SIS ID 405 uniquely identifies the SIS 106.

In some examples, the SIS ID 405 is encoded in a quick response code (QR code 170) code that is scanned by an imager of the mobile device 104.

In some examples, the QR code 170 is dynamically generated by the SIS 106 at a time of a session, and the QR code 170 encodes a monetary amount.

In some examples, the QR code 170 is a static image that is associated with the SIS 106, wherein the mobile device 104 is configured to specify a monetary amount in the session information 150.

In some examples, the account server 108 is configured to recognize the session as being associated with a card-present session responsive to the communication of the account information to the account server 108.

In some examples, the SIS 106 comprises a keypad.

Some examples further involve receiving, by the authentication server 102 and from the SIS 106 via the determined communication mode, an indication that the session was successful.

Some examples further involve communicating, by the authentication server 102 and to the mobile device 104, the indication that the session was successful.

In some examples, the SIS 106 is configured to request further authentication from the mobile device 104 prior to the completion of the session.

In some examples, the further authentication corresponds to one of specification of a personal identification number (PIN) associated with a user of the mobile device 104, comparison of a fingerprint data read on both the mobile device 104 and the SIS 106, and comparison of facial recognition data read on both the mobile device 104 and the SIS 106.

Second Example Environment

Figure 9:
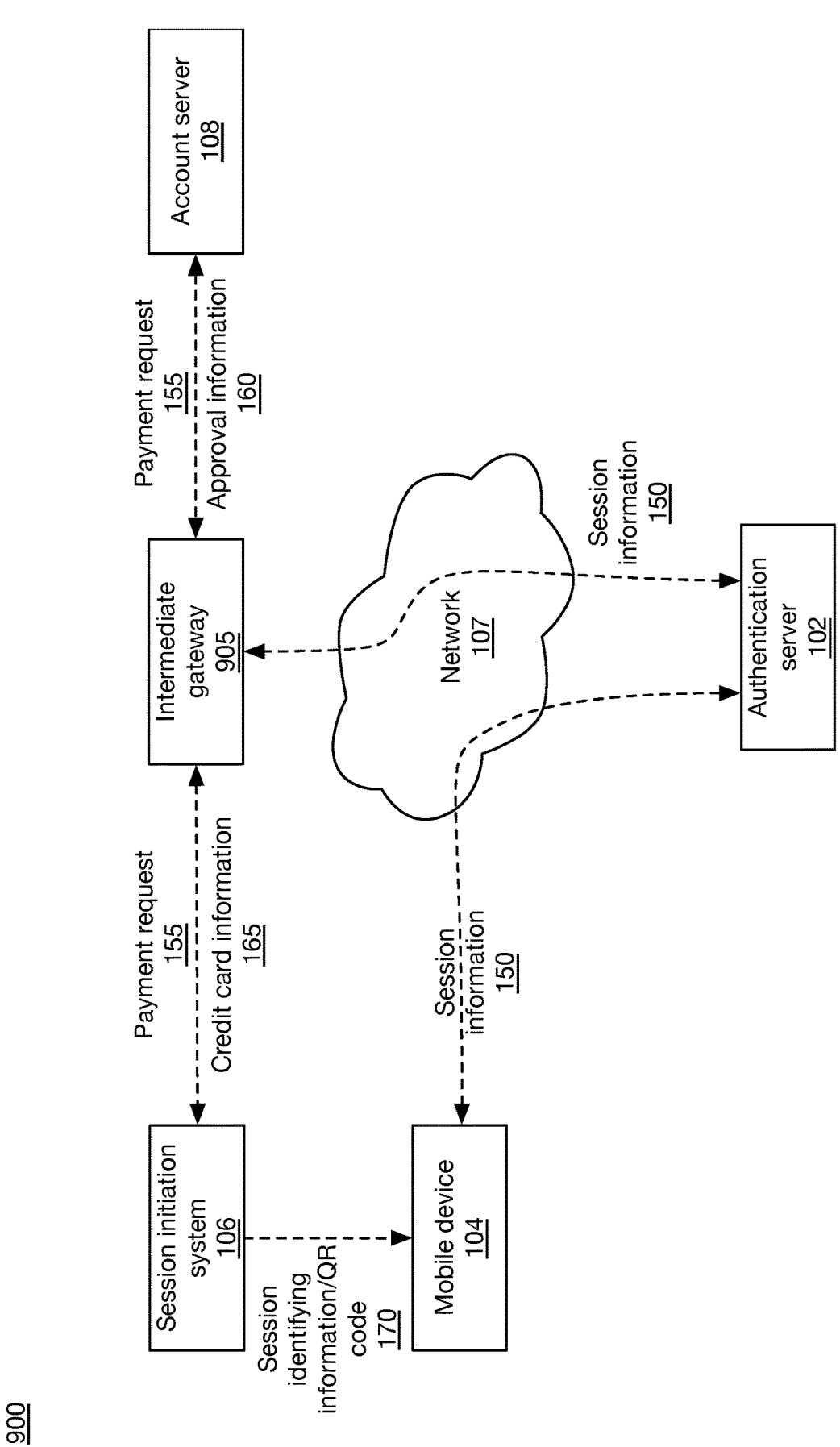
FIG. 9 illustrates a second environment that facilitates authentication of a digital information exchange session, in accordance with an example.

FIG. 9 illustrates another example of an environment 900 that facilitates authentication of a digital information exchange session. Illustrated entities of the environment 900 include an authentication server 102, a mobile device 104, a session initiation system (SIS) 106, an account server 108, and an intermediate gateway 905. The various entities of the environment 100 can communicate with one another via a network 107, such as the Internet.

The authentication server 102, mobile device 104, SIS 106, and account server 108 can operate in a similar manner as the corresponding entities described above. The description of these entities is not repeated for the sake of brevity.

Figure 10:
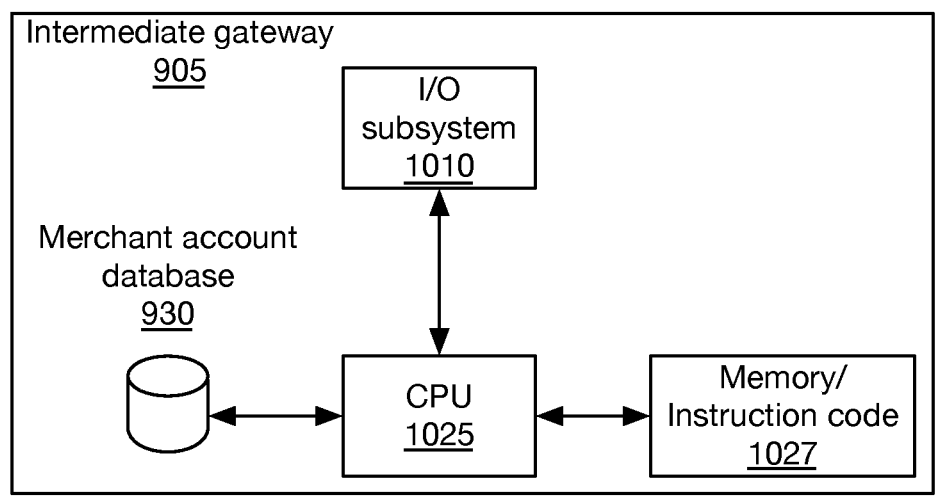
FIG. 10 illustrates an intermediate gateway of the environment of FIG. 9, in accordance with an example.

FIG. 10 illustrates an example of the intermediate gateway 905. The intermediate gateway 905 can include a processor 1025, a memory device 1027, and an I/O subsystem 1010. An example of the intermediate gateway 905 can include a merchant account database 930.

The processor 1025 executes instruction code stored in the memory device 1027 for coordinating activities performed between the various subsystems of the intermediate gateway 905. As an example, the processor 1025 can correspond to a stand-alone processor such as an Intel®, AMD®, or PowerPC® based processor or a different processor. The intermediate gateway 905 can include an operating system, such as Microsoft Windows®, Linux, Unix®, or another operating system that operates on the processor 1025. Operations performed by the intermediate gateway 905 are described in further detail below.

The I/O subsystem 1010 can include one or more input/output interfaces configured to facilitate communications with entities outside of the intermediate gateway 905. An example of the I/O subsystem 1010 can be configured to communicate information over a network such as the Internet or a "Plain Ordinary Telephone Service" (POTS). Another example of the I/O subsystem 1010 can be configured to communicate information using a communication methodology such as, for example, a RESTful API or a Web Service API. In some cases, the I/O subsystem 1010 can implement a web browser to facilitate generating one or more web-based interfaces through which users of the intermediate gateway 905 can operate the intermediate gateway 905.

An example of the I/O subsystem 1010 can facilitate communicating credit card information to the merchant-facing system 310 and/or the customer-facing system 320 of the SIS 106. The I/O subsystem 1010 can further facilitate receiving a payment request from the merchant-facing system 310 and/or the customer-facing system 320. An example of the I/O subsystem 1010 can be configured to encrypt communications. For example, the I/O subsystem 1010 can be configured to encrypt credit card information via a financial services industry-accepted manner for doing so.

An example of the intermediate gateway 905 can correspond to a payment gateway. Merchants can contract with an operator of the intermediate gateway 905 to provide various services via the intermediate gateway 905. For example, the intermediate gateway 905 can facilitate payment sessions by transferring information between a merchant system such as the SIS 106 or a payment portal (e.g., a website), and an acquiring bank (e.g., account server 108). The intermediate gateway 905 can be configured to facilitate the authorization of credit card or direct payments processing for online retailers, traditional brick and mortar retailers, etc.

The merchant account database 930 can include records that specify merchant IDs 420 associated with merchants that have contracted with the operator of the intermediate gateway 905 for services. The records can specify SIS IDs 405 associated with the merchants. As noted above, the SIS ID 405 can uniquely identify a particular SIS 106. For example, the SIS ID 405 can correspond to a MAC address, a uniform resource locator (URL), an IP address, a phone number, or a different type of identifier.

In operation, the intermediate gateway 905 can be configured to receive session information 150 from the authentication server 102. The intermediate gateway 905 can be further configured to communicate credit card information 165 (e.g., credit card number, card verification value (CVS), etc.) specified in the session information 150 to the SIS 106. The intermediate gateway 905 can be further configured to receive a payment request 155 from the SIS 106 that specifies the credit card information 165 and a monetary amount associated with the session information. After receiving the payment request 155, the intermediate gateway 905 can communicate the payment request 155 to the account server 108, and the account server 108 can subsequently transfer funds from a first account specified by the credit card information 165 to a second account associated with the account server 108.

Figure 11:
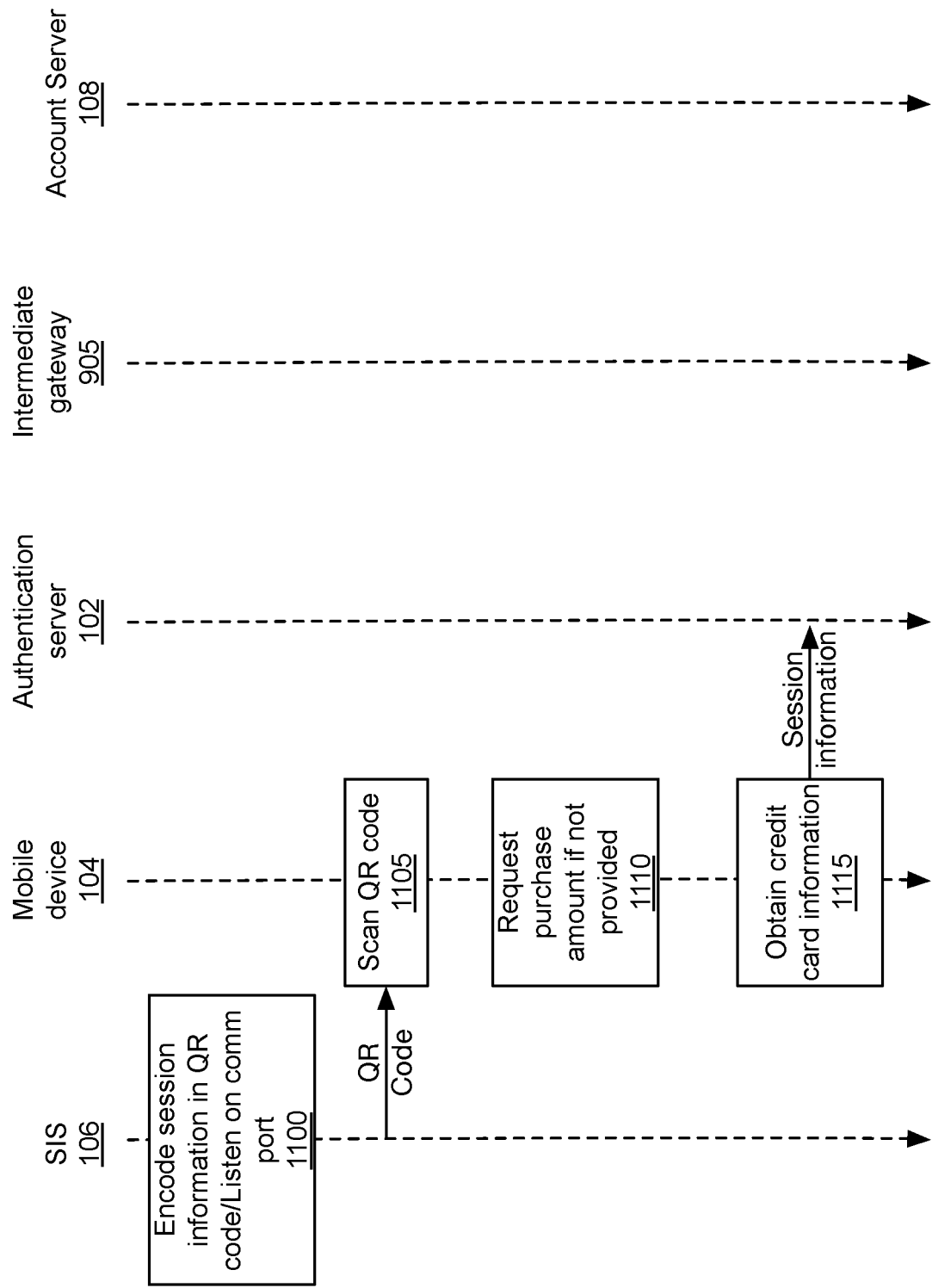
FIG. 11 illustrates operations that can be performed by one or more entities of the environment of FIG. 9 to authenticate digital information exchange sessions, in accordance with an example.
Figure 11:
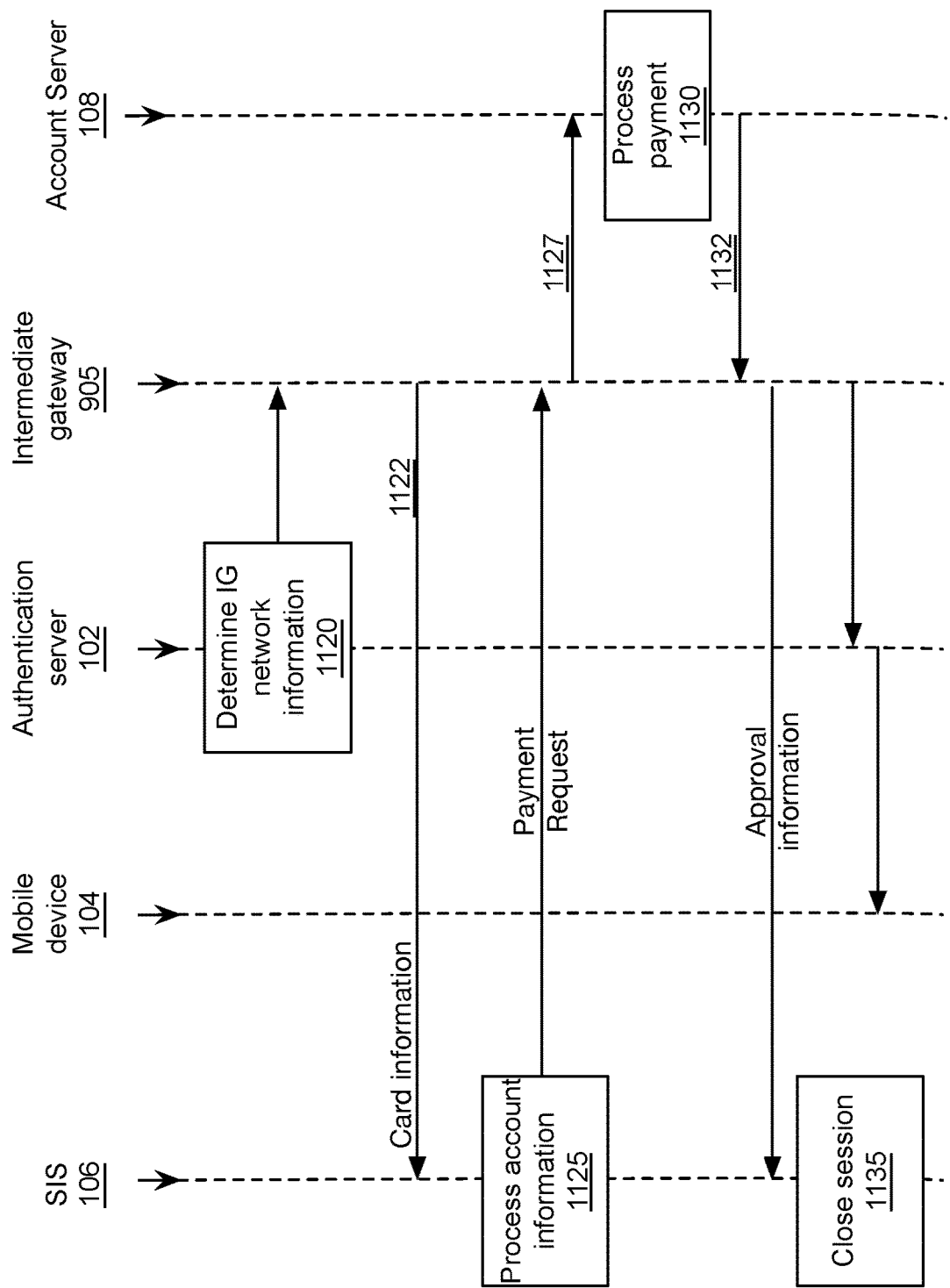

FIG. 11 illustrates an example of operations that can be performed by one or more entities of the environment 900 of FIG. 9 to authenticate digital information exchange sessions. In this regard, one or more of the entities can store instruction code in respective memories of the entities that can be executed by respective processors of the entities to control the entities to perform one or more of the operations.

At operation 1100, a QR code 170 can be generated by the SIS 106. In this regard, the SIS 106 can encode information associated with a session such as a merchant ID 420, a payment/session ID 415, and an SIS ID 405 within the QR code 170. In some examples, the SIS 106 can encode a payment amount 410 associated with the session. After generating the QR code 170, the SIS 106 can present the QR code 170 to a customer via, for example, the customer-facing system 320 of the SIS 106.

After the presentation of the QR code 170, the SIS 106 can enter into a "waiting" state, during which the SIS 106 expects to receive encrypted credit card information from the intermediate gateway 109. While in the "waiting" state, the SIS 106 can prevent further sessions from being performed via the SIS 106.

An example of the SIS 106 can be configured to remain within the "waiting" state for a threshold amount of time (e.g., 10 sec, 60 sec). If the credit card information is not received during that time, the session can be aborted. In one example, the SIS 106 can report the reason why the session was aborted. An example of the SIS 106 can prompt the customer to try to read the QR code again. The QR code can be the same or different on the second attempt.

In some examples, some or all of the operations described above can be performed by the customer-facing system 320 of the SIS 106.

The operations performed at blocks 1105-1115 can correspond respectively to the operations performed at blocks 605-615 in FIG. 6. The description of these aspects is not repeated for the sake of brevity.

At operation 1120, the authentication server 102 can receive the session information 150 from the mobile device 104. An example of the authentication server 102 can perform the operations of operation 620 of FIG. 6, described above. Additionally or alternatively, an example of the authentication server 102 can extract the SIS ID 405 from the session information 150. The authentication server 102 can use the SIS ID 405 to determine the network information associated with an intermediate gateway 905 that is associated with the SIS ID 405 (i.e., the intermediate gateway with which the SIS 106 communicates). An example of the network information can specify the communication mode and a URL, IP address, phone number, or another identifier that can uniquely identify the intermediate gateway 905. In some examples, the SIS ID 405 can specify the network information. In other examples, the authentication server 102 can search the merchant ID database 130 for a record associated with the merchant ID 420 and/or the SIS ID 405 that specifies the network information associated with the intermediate gateway 905.

After determining the network information, the authentication server 102 can communicate some or all of the session information 150 to the intermediate gateway 905 via the communication mode specified by the network information.

At operation 1122, the intermediate gateway 905 can forward information specified in the session information 150 to the SIS 106. For example, the intermediate gateway 905 can communicate the credit card information 165 to the SIS 106. The credit card information can be encrypted. In some examples, the intermediate gateway 905 can also communicate the payment/session ID 415 that can be specified in the session information 150 to the SIS 106.

At operation 1125, the SIS 106 can generate a payment request 155 that specifies the credit card information 165 and the monetary amount. The SIS 106 can then communicate the payment request 155 to the intermediate gateway 905. In some examples, the payment request 155 can further specify a merchant or merchant ID 420.

As noted above, the SIS 106 can be in a "waiting" state and prevented from processing further sessions. Therefore, when the credit card information 165 is received from the intermediate gateway 905, the SIS 106 can understand the credit card information 165 to be associated with the pending session, which is, in turn, associated with a monetary amount (i.e., the amount the customer owes).

In an example, operations 1125 can be performed by the customer-facing system 320 of the SIS 106. For example, the customer-facing system 320 can be assigned an IP address that facilitates networked communications over the Internet. The customer-facing system 320 can receive the encrypted credit card information 165 from the intermediate gateway 905, subsequently generate the payment request 155 and communicate the payment request 155 to the intermediate gateway 905. The processing of the session can, therefore, appear similar to the processing that is performed when a customer inserts a credit card directedly into the customer-facing system 320. That is, the account server 108 can consider the session to be a card-present session as opposed to a card-not-present transaction, which can be assessed higher session fees.

At operation 1127, the intermediate gateway 905 can determine an account server 108 (e.g., an acquiring bank) and forward the payment request 155 to the appropriate account server 108. For example, the payment request 155 can specify a network address associated with the account server 108 (e.g., phone number, URL address) through which payment requests are processed by the account server 108. The intermediate gateway 905 can communicate the payment request 155 via the appropriate network address.

At operation 1130, after receiving the payment request 155, the account server 108 can be configured to processes the payment request 155, as described in operation 630 of FIG. 6. After processing the payment request 155, at operation 1132, the account server 108 can communicate approval information 160 to the intermediate gateway 905. The intermediate gateway 109 can then forward the approval information 160 to the SIS 106 from which the payment request 155 was received. In some examples, the intermediate gateway 109 can also forward the approval information 160 to the authentication server 102, and the authentication server 102 can subsequently forward the approval information 160 to the mobile device 104.

At operation 1135, upon receiving the approval information 160, the SIS 106 can set a flag associated with the session to indicate "Payment Received" and close the session. Afterward, the SIS 106 can move from the "waiting" state referred to above to a "pending new session" state so that the operations above can be repeated for the next customer session.

Figure 12:
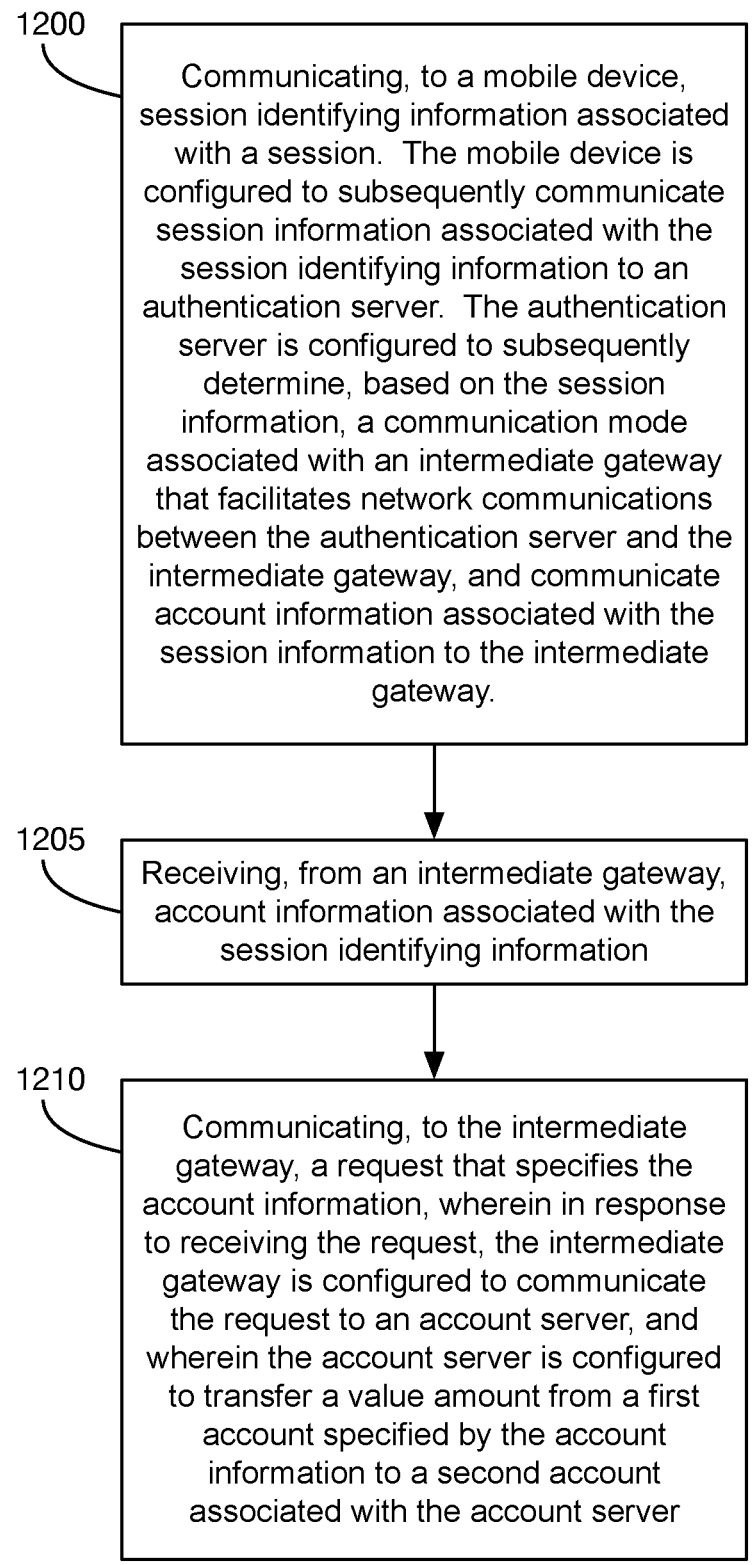
FIG. 12 illustrates a computer-implemented method that can be implemented in the second environment of FIG. 9, in accordance with an example.

FIG. 12 illustrates a computer-implemented method that can be implemented in the environment of FIG. 9. Block 1200 can involve communicating, to a mobile device, session identifying information associated with a session.

Block 1205 can involve receiving, from an intermediate gateway, account information associated with the session identifying information. The mobile device is configured to subsequently communicate at least part of the session identifying information to an authentication server, and the authentication server is configured to subsequently communicate at least part of the session identifying information to an intermediate gateway.

Block 1210 can involve communicating, to the intermediate gateway, a request/payment request that specifies the account information. In response to receiving the request/payment request, the intermediate gateway is configured to communicate the request to an account server, and the account server is configured to transfer a value amount/funds from a first account specified by the account information to a second account associated with the account server.

In some examples, the session identifying information specifies an SIS identifier that uniquely identifies the SIS.

In some examples, the session identifying information is encoded in a quick response code (QR code) that is configured to be scanned by an imager of the mobile device.

In some examples, the QR code is dynamically generated by the SIS at a time of the session, and the QR code encodes a value/monetary amount.

In some examples, the QR code is a static image that is associated with the SIS. The mobile device is configured to specify a value/monetary amount in the session information.

In some examples, the account server is configured to recognize the request as being associated with a card-present session.

In some examples, the SIS includes a pin entry device (PED) that facilitates the specification of a personal identification number (PIN) by a user. In this example, communication of the session identifying information, receiving of the account information, and communication of the request are performed by the PED.

Third Example Environment

In the example operations of FIG. 11, the account server 108 considers the session to be a card-present session because the credit card information is ultimately communicated from the SIS 106 to the account server 108 via the intermediate gateway 905. In some examples, an account server 106 can consider a session as a card-present session when a user enters a personal identification number (PIN) at the SIS 106 (e.g., via the keypad 330). That is, the credit card information may not be required for the session to be considered a card-present session.

FIG. 13 illustrates an example of operations that can be performed by one or more entities of the environment 900 of FIG. 9 to authenticate digital information exchange sessions based on the communication of a PIN from the SIS 106 to the account server 108. In this regard, one or more of the entities can store instruction code in respective memories of the entities that can be executed by respective processors of the entities to control the entities to perform one or more of the operations.

At operation 1300, a QR code 170 can be generated by the SIS 106. In this regard, the SIS 106 can encode information associated with a session such as a merchant ID 420, a payment/session ID 415, and an SIS ID 405 within the QR code 170. In some examples, the SIS 106 can encode a payment amount 410 associated with the session. After generating the QR code 170, the SIS 106 can present the QR code 170 to a customer via, for example, the customer-facing system 320 of the SIS 106.

After the presentation of the QR code 170, the SIS 106 can enter into a "waiting" state, during which the SIS 106 expects to receive a personal identification number (PIN) request from the intermediate gateway 109. While in the "waiting" state, the SIS 106 can prevent further sessions from being performed via the SIS 106.

An example of the SIS 106 can be configured to remain within the "waiting" state for a threshold amount of time (e.g., 10 sec, 60 sec). If the pin request is not received during that time, the session can be aborted. In one example, the SIS 106 can report the reason why the session was aborted. An example of the SIS 106 can prompt the customer to try to read the QR code again. The QR code can be the same or different on the second attempt.

In some examples, some or all of the operations described above can be performed by the customer-facing system 320 of the SIS 106.

The operations performed at blocks 1305-1315 can correspond respectively to the operations performed at blocks 605-615 in FIG. 6. The description of these aspects is not repeated for the sake of brevity.

At operation 1320, the authentication server 102 can receive the session information 150 from the mobile device 104. An example of the authentication server 102 can perform the operations of operations 620 of FIG. 6 and the operations of operations 1120 of FIG. 11, described above. As noted above, after determining the network information, the authentication server 102 can communicate some or all of the session information 150 to the intermediate gateway 905 via the communication mode specified by the network information. The session information 150 can include the PIN associated with the credit card information 165. The authentication server 102 can communicate an indication to the intermediate gateway 905 that the PIN is sufficient to have the session considered as a card-present session. In an example, the merchant ID database 130 of the authentication server 102 specifies whether a particular merchant allows PIN entries to qualify as card-present sessions/transactions.

At operation 1322, in response to having received the PIN and the indication above, the intermediate gateway 905 can communicate a PIN request to the SIS 106. In an example, the intermediate gateway 905 further communicates the PIN associated with the credit card information 165. In an example, this information can be encrypted. In some examples, the intermediate gateway 905 can also communicate the payment/session ID 415 that can be specified in the session information 150 to the SIS 106.

At operation 1325, the SIS 106 can prompt the user associated with the session (i.e., the customer) to enter the PIN associated with his credit card (i.e., the PIN associated with the credit card information 165).

In examples where the intermediate gateway 905 communicates the PIN to the SIS 106, the SIS 106 can confirm that the user specified PIN matches the PIN received from the intermediate gateway 905 before proceeding further. If the user-specified PIN is a match, then the SIS 106 can generate a payment request 155 that specifies the monetary amount and an indication that the user-specified PIN was a match in the payment request 155. In some examples, the SIS 106 can further specify the PIN. The SIS 106 can then communicate the payment request 155 to the intermediate gateway 905. In cases where the user-specified PIN does not match, the SIS 106 can prompt the user to re-enter the PIN and/or cancel the session altogether.

In examples where the intermediate gateway 905 does not communicate the PIN to the SIS 106, the SIS 106 can include the user-specified PIN in the payment request 155 and subsequently communicate the payment request 155 to the intermediate gateway 905. As noted previously, in some examples, the payment request 155 can further specify a merchant or merchant ID 420.

As noted above, the SIS 106 can be in a "waiting" state and prevented from processing further sessions. Therefore, when the PIN is received from the intermediate gateway 905, the SIS 106 can understand the PIN to be associated with the pending session, which is, in turn, associated with a monetary amount (i.e., the amount the customer owes).

In an example, operations 1325 can be performed by the customer-facing system 320 of the SIS 106. For example, the customer-facing system 320 can be assigned an IP address that facilitates networked communications over the Internet. The customer-facing system 320 can receive the PIN from the intermediate gateway 905, subsequently generate the payment request 155 and communicate the payment request 155 to the intermediate gateway 905. The processing of the session can, therefore, appear similar to the processing that is performed when a customer inserts a credit card directedly into the customer-facing system 320. That is, the account server 108 can consider the session to be a card-present session as opposed to a card-not-present session, which can be assessed higher session fees.

At operation 1327, the intermediate gateway 905 can receive the payment request 155 from the SIS 106 and update/modify the payment request 155 to include the credit card information 165 previously communicated from the authentication server 102 to the intermediate gateway 905. In this regard, in an example, the intermediate gateway 905 can maintain the credit card information 165 until receiving the payment request from the SIS 106. After updating the payment request, the intermediate gateway 905 can determine an account server 108 (e.g., an acquiring bank) and forward the payment request 155 to the appropriate account server 108. For example, the payment request 155 can specify a network address associated with the account server 108 (e.g., phone number, URL address) through which payment requests are processed by the account server 108. The intermediate gateway 905 can communicate the payment request 155 via the appropriate network address.

At operation 1330, after receiving the payment request 155, the account server 108 can be configured to processes the payment request 155, as described in operation 630 of FIG. 6. As noted above, in some examples, the account server 106 can consider a session as a card-present session when a user enters a personal identification number (PIN) at the SIS 106. In this case, communication of the credit card information 165 from the SIS 106 may be unnecessary to have the session considered as a card-present session. When requesting a transfer of funds from the issuing bank, the account server 108 can specify, in the transfer request, the user-specified PIN along with the credit card information 165, session amount, etc. The issuing bank can determine whether the user-specified PIN matches the PIN associated with the credit card.

If the user-specified PIN matches the PIN associated with the credit card information 165, the issuing bank can approve and process the transfer request, and funds can be transferred from the issuing bank to the account server 108. If the user-specified PIN does not match the PIN associated with the credit card information 165, the issuing bank can decline the transfer request.

After processing the payment request 155, at operation 1332, if the transfer request was approved, the account server 108 can communicate approval information 160 to the intermediate gateway 905. The intermediate gateway 109 can then forward the approval information 160 to the SIS 106 from which the payment request 155 was received. In some examples, the intermediate gateway 109 can also forward the approval information 160 to the authentication server 102, and the authentication server 102 can subsequently forward the approval information 160 to the mobile device 104.

If the transfer request was declined, the account server 108 can forward an indication of this issue to the intermediate gateway 905, which can, in turn, forward an indication of this issue to the SIS 106. In some examples, the intermediate gateway 905 can retain the credit card information 165 associated with the session until receiving a session canceled indication from the SIS 106 indicating that the session has been canceled. Additionally, or alternatively, the intermediate gateway 905 can purge the credit card information 165 from its storage after a timeout period, such as 1 minute.

At operation 1335, if the transfer request was approved, upon receiving the approval information 160, the SIS 106 can set a flag associated with the session to indicate "Payment Received" and close the session. Afterward, the SIS 106 can move from the "waiting" state referred to above to a "pending new session" state so that the operations above can be repeated for the next customer session.

If the transfer request was declined, the SIS 106 can, in some examples, prompt the user to re-specify the PIN number and/or can cancel the session. In this regard, in some examples, the SIS 106 can communicate a session canceled indication to the intermediate gateway 905 to indicate to the intermediate gateway 905 that the session has been canceled. In response, the intermediate gateway 905 can purge the credit card information 165 from its storage.

Additional Examples

Additional examples are disclosed in the groups of clauses described below. The clauses are arranged within groups for clarity.

Group A

Clause 1. A computer-implemented method comprising:
i. receiving, by an authentication server 102 and from a mobile device 104, session information 150 associated with a session that occurs at a session initiation system (SIS 106) in proximity to the mobile device 104;
ii. determining, by the authentication server 102 and based on the session information 150, a communication mode associated with the SIS 106 that facilitates network communications between the authentication server 102 and the SIS 106; and
iii. communicating, by the authentication server 102 and to the SIS 106, account information associated with the session information 150 via the determined communication mode, wherein the SIS 106 is subsequently configured to communicate the account information to an account server 108, and wherein the account server 108 is configured to transfer a value amount from a first account specified by the account information to a second account associated with the account server.

Clause 2. The computer-implemented according to any of the clauses in any of the groups of clauses, wherein the session information 150 is associated with an SIS ID 405 that is read by the mobile device 104, wherein the SIS ID 405 uniquely identifies the SIS 106.

Clause 3. The computer-implemented according to any of the clauses in any of the groups of clauses, wherein the SIS ID 405 is encoded in a quick response code (QR code) that is scanned by an imager of the mobile device 104.

Clause 4. The computer-implemented according to any of the clauses in any of the groups of clauses, wherein the QR code 170 is dynamically generated by the SIS 106 at a time of a session, and the QR code 170 encodes a value/monetary amount.

Clause 5. The computer-implemented according to any of the clauses in any of the groups of clauses, wherein the QR code 170 is a static image that is associated with the SIS 106, wherein the mobile device 104 is configured to specify a value/monetary amount in the session information 150.

Clause 6. The computer-implemented according to any of the clauses in any of the groups of clauses, wherein responsive to the communication of the account information to the account server 108, the account server 108 is configured to recognize the session as being associated with a card-present session.

Clause 7. The computer-implemented according to any of the clauses in any of the groups of clauses, wherein the SIS 106 comprises a keypad.

Clause 8. The computer-implemented according to any of the clauses in any of the groups of clauses, further comprising receiving, by the authentication server 102 and from the SIS 106 via the determined communication mode, an indication that the value amount has been transferred from the first account the second account.

Clause 9. The computer-implemented according to any of the clauses in any of the groups of clauses, further comprising communicating, by the authentication server 102 and to the mobile device 104, the indication that the session was successful.

Clause 10. The computer-implemented according to any of the clauses in any of the groups of clauses, wherein the SIS 106 is configured to request further authentication from the mobile device 104 prior to complete the session.

Clause 11. The computer-implemented according to any of the clauses in any of the groups of clauses, wherein the further authentication corresponds to one of: specification of a personal identification number (PIN) associated with a user of the mobile device 104, comparison of a fingerprint data read on both the mobile device 104 and the SIS 106, and comparison of a facial recognition data read on both the mobile device 104 and the SIS 106.

Clause 12. A system comprising a memory that stores instruction code; and a processor in communication with the memory, wherein the instruction code is executable by the processor to cause the processor to perform the method of any of the preceding clauses.

Clause 13. A non-transitory computer-readable medium having stored thereon instruction code, wherein the instruction code is executable by a processor of a computer to perform the method of any of the preceding clauses.

Group B

Clause 1. A computer-implemented method comprising:
i. receiving, by an authentication server and from a mobile device, session information associated with a session that occurs at a session initiation system (SIS) in proximity to the mobile device;
ii. determining, by the authentication server and based on the session information, an intermediate gateway associated with the SIS that facilitates session-related communications between the authentication server and the SIS; and
iii. communicating, by the authentication server and to the intermediate gateway, account information associated with the session information, wherein the intermediate gateway is configured to subsequently communicate the account information to the SIS, wherein in response to receiving the account information, the SIS is configured to communicate a request that specifies the account information to the intermediate gateway, wherein in response to receiving the request, the intermediate gateway is configured to communicate the request to an account server, and wherein the account server is configured to transfer a value amount from a first account specified by the account information to a second account associated with the account server.

Clause 2. The computer-implemented method according to any of the clauses in any of the groups of clauses, wherein the session information is associated with an SIS identifier that is read by the mobile device, wherein the SIS identifier uniquely identifies the SIS.

Clause 3. The computer-implemented method according to any of the clauses in any of the groups of clauses, wherein the SIS identifier is encoded in a quick response code (QR code) that is scanned by an imager of the mobile device.

Clause 5. The computer-implemented method according to any of the clauses in any of the groups of clauses, wherein the QR code is dynamically generated by the SIS at a time of the session, and the QR code encodes a value/monetary amount.

Clause 7. The computer-implemented method according to any of the clauses in any of the groups of clauses, wherein the QR code is a static image that is associated with the SIS, wherein the mobile device is configured to specify a value/monetary amount in the session information.

Clause 8. The computer-implemented method according to any of the clauses in any of the groups of clauses, wherein responsive to the communication of the account information to the account server, the account server is configured to recognize the session as being associated with a card-present session.

Clause 9. The computer-implemented method according to any of the clauses in any of the groups of clauses, wherein the SIS comprises a keypad.

Clause 10. The computer-implemented method according to any of the clauses in any of the groups of clauses, further comprising receiving, by the authentication server and from the SIS via the communication mode, an indication that the value amount has been transferred from the first account the second account.

Clause 11. The computer-implemented method according to any of the clauses in any of the groups of clauses, further comprising communicating, by the authentication server and to the mobile device, the indication.

Clause 12. The computer-implemented method according to any of the clauses in any of the groups of clauses, wherein the SIS is configured to request a further authentication from the mobile device prior to completion of the session.

Clause 13. The computer-implemented method according to any of the clauses in any of the groups of clauses, wherein the further authentication corresponds to one of: specification of a personal identification number (PIN) associated with a user of the mobile device, comparison of a fingerprint data read on both the mobile device and the SIS, and comparison of a facial recognition data read on both the mobile device and the SIS.

Clause 14. A system comprising a memory that stores instruction code; and a processor in communication with the memory, wherein the instruction code is executable by the processor to cause the processor to perform the method of any of the preceding clauses.

Clause 15. A non-transitory computer-readable medium having stored thereon instruction code, wherein the instruction code is executable by a processor of a computer to perform the method of any of the preceding clauses.
Group C Clause 1. A method performed by a session initiation system (SIS) comprising:
  i. communicating, to a mobile device, session identifying information associated with a session, wherein the mobile device is configured to subsequently communicate session information associated with the session identifying information to an authentication server, and the authentication server is configured to subsequently determine, based on the session information, a communication mode associated with an intermediate gateway that facilitates network communications between the authentication server and the intermediate gateway;
  ii. receiving, from the intermediate gateway, account information associated with the session information; and
  iii. communicating, to the intermediate gateway, a request that specifies the account information, wherein in response to receiving the request, the intermediate gateway is configured to communicate the request to an account server, and wherein the account server is configured to transfer a value amount from a first account specified by the account information to a second account associated with the account server.

Clause 2. The method according to any of the clauses in any of the groups of clauses, wherein the session identifying information specifies an SIS identifier that uniquely identifies the SIS.

Clause 3. The method according to any of the clauses in any of the groups of clauses, further comprising encoding the session identifying information in a quick response code (QR code) that is configured to be scanned by an imager of the mobile device.

Clause 4. The method according to any of the clauses in any of the groups of clauses, further comprising generating the QR at a time of the session, and encoding a value/monetary amount in the QR code.

Clause 5. The method according to any of the clauses in any of the groups of clauses, wherein the QR code is a static image that is associated with the SIS, wherein the mobile device is configured to specify a value/monetary amount in the session information.

Clause 6. The method according to any of the clauses in any of the groups of clauses, wherein the account server is configured to recognize the request as being associated with a card-present session.

Clause 7. The method according to any of the clauses in any of the groups of clauses, wherein the SIS includes a pin entry device (PED) that facilitates specification of a personal identification number by a customer, wherein communication of the session identifying information, receiving of the account information, and communication of the request are performed by the PED.

Clause 8. The method according to any of the clauses in any of the groups of clauses, further comprising subsequent to communicating the session identifying information to the mobile device, entering a "waiting" state in which further session processing by the SIS is prevented, and after receiving an indication that a value amount was transferred from the first account specified by the account information to the second account associated with the account server, entering a "pending new session" in which further session processing by the SIS is allowed.

Clause 9. A system comprising a memory that stores instruction code; and a processor in communication with the memory, wherein the instruction code is executable by the processor to cause the processor to perform the method of any of the preceding clauses.

Clause 10. A non-transitory computer-readable medium having stored thereon instruction code, wherein the instruction code is executable by a processor of a computer to perform the method of any of the preceding clauses.
Group D Clause 1. A method performed by an intermediate gateway (IG) comprising
  i. receiving, from an authentication server, session identifying information, wherein the session identifying information is received by the authentication server from a mobile device that is in proximity to a session initiation system (SIS), wherein the session identifying information is associated with a session that occurs at the SIS;
  ii. communicating, to the SIS, account information associated with the session identifying information;
  iii. receiving, from the SIS, a request that specifies the account information;
  iv. communicating the request to an account server, wherein the account server is configured to transfer a value amount from a first account specified by the account information to a second account associated with the account server;

v. receiving from the account server, approval information associated with the request; and vi. communicating the approval information to the SIS.

Clause 2. The method according to any of the clauses in any of the groups of clauses, wherein the session identifying information specifies an SIS identifier that uniquely identifies the SIS.

Clause 3. The computer-implemented method according to any of the clauses in any of the groups of clauses, wherein the session identifying information is encoded in a quick response code (QR code) that is configured to be scanned by an imager of the mobile device.

Clause 4. The computer-implemented method according to any of the clauses in any of the groups of clauses, wherein the QR code is dynamically generated by the SIS at a time of the session, and the QR code encodes a value/monetary amount.

Clause 5. The computer-implemented method according to any of the clauses in any of the groups of clauses, wherein the QR code is a static image that is associated with the SIS, wherein the mobile device is configured to specify a value/monetary amount in the session information.

Clause 6. The computer-implemented method according to any of the clauses in any of the groups of clauses, wherein the account server is configured to recognize the request as being associated with a card-present session.

Clause 7. The computer-implemented method according to any of the clauses in any of the groups of clauses, wherein the SIS includes a pin entry device (PED) that facilitates specification of a personal identification number by a customer, wherein communication of the session identifying information, receiving of the account information, and communication of the request are performed by the PED.

Clause 8. The computer-implemented method according to any of the clauses in any of the groups of clauses, further comprising subsequent to communicating the session identifying information to the mobile device, entering a "waiting" state in which further session processing by the SIS is prevented, and after receiving an indication that the value amount was transferred from the first account specified by the account information to the second account associated with the account server, entering a "pending new session" in which further session processing by the SIS is allowed.

Clause 9. A system comprising a memory that stores instruction code; and a processor in communication with the memory, wherein the instruction code is executable by the processor to cause the processor to perform the method of any of the preceding clauses.

Clause 10. A non-transitory computer-readable medium having stored thereon instruction code, wherein the instruction code is executable by a processor of a computer to perform the method of any of the preceding clauses.

While the systems and methods of operation have been described with reference to certain examples, it will be understood by those skilled in the art that various changes can be made and equivalents can be substituted without departing from the scope of the claims. Therefore, it is intended that the present methods and systems not be limited to the particular example disclosed, but that the disclosed methods and systems include all embodiments falling within the scope of the appended claims.

Group E

Clause 1. A method performed by a session initiation system (SIS) comprising:

i. communicating, to a mobile device, session identifying information associated with a session, wherein the mobile device is configured to subsequently communicate session information associated with the session identifying information to an authentication server, and the authentication server is configured to subsequently determine, based on the session information, a communication mode associated with an intermediate gateway that facilitates network communications between the authentication server and the intermediate gateway;

ii. receiving, from the intermediate gateway, a personal identification number (PIN) request; and iii. receiving, via a keypad of the SIS, a user-specified PIN; and iv. communicating, to the intermediate gateway, a request that specifies the user-specified PIN, wherein in response to receiving the request, the intermediate gateway is configured to communicate the request to an account server, and wherein the account server is configured to transfer a value amount from a first account specified by the account information to a second account associated with the account server.

Clause 2. The method according to any of the clauses in any of the groups of clauses, wherein the session identifying information specifies an SIS identifier that uniquely identifies the SIS.

Clause 3. The method according to any of the clauses in any of the groups of clauses, further comprising encoding the session identifying information in a quick response code (QR code) that is configured to be scanned by an imager of the mobile device.

Clause 4. The method according to any of the clauses in any of the groups of clauses, further comprising generating the QR code at a time of the session, and encoding a value/monetary amount in the QR code.

Clause 5. The method according to any of the clauses in any of the groups of clauses, wherein the QR code is a static image that is associated with the SIS, wherein the mobile device is configured to specify a value/monetary amount in the session information.

Clause 6. The method according to any of the clauses in any of the groups of clauses, wherein the account server is configured to recognize the request as being associated with a card-present session.

Clause 7. The method according to any of the clauses in any of the groups of clauses, wherein the SIS includes a pin entry device (PED) that facilitates specification of a personal identification number by a customer, wherein communication of the session identifying information, receiving of the account information, and communication of the request are performed by the PED.

Clause 8. The method according to any of the clauses in any of the groups of clauses, further comprising subsequent to communicating the session identifying information to the mobile device, entering a "waiting" state in which further session processing by the SIS is prevented, and after receiving an indication that the value amount was transferred from the first account specified by the account information to the second account associated with the account server, entering a "pending new session" state in which further session processing by the SIS is allowed.

Clause 9. A system comprising a memory that stores instruction code; and a processor in communication with the memory, wherein the instruction code is executable by the processor to cause the processor to perform the method of any of the preceding clauses.

Clause 10. A non-transitory computer-readable medium having stored thereon instruction code, wherein the instruction code is executable by a processor of a computer to perform the method of any of the preceding clauses.

Group F

Clause 1. A method performed by an intermediate gateway (IG) comprising:
  i. receiving, from an authentication server, session identifying information, wherein the session identifying information is received by the authentication server from a mobile device that is in proximity to a session initiation system (SIS), wherein the session identifying information is associated with a session that occurs at the SIS;
  ii. communicating, to the SIS, a personal identification number (PIN) request associated with account information that is associated with the session identifying information;
  iii. receiving, from the SIS, a request that specifies a user-specified PIN;
  iv. updating the request to specify account information associated with the session identifying information; and
  v. communicating the updated request to an account server, wherein the account server is configured to transfer a value amount from a first account specified by the account information to a second account associated with the account server;
  vi. receiving from the account server, approval information associated with the request; and
  vii. communicating the approval information to the SIS.

Clause 2. The method according to any of the clauses in any of the groups of clauses, wherein the session identifying information specifies an SIS identifier that uniquely identifies the SIS.

Clause 3. The computer-implemented method according to any of the clauses in any of the groups of clauses, wherein the session identifying information is encoded in a quick response code (QR code) that is configured to be scanned by an imager of the mobile device.

Clause 4. The computer-implemented method according to any of the clauses in any of the groups of clauses, wherein the QR code is dynamically generated by the SIS at a time of the session, and the QR code encodes a value/monetary amount.

Clause 5. The computer-implemented method according to any of the clauses in any of the groups of clauses, wherein the QR code is a static image that is associated with the SIS, wherein the mobile device is configured to specify a value/monetary amount in the session information.

Clause 6. The computer-implemented method according to any of the clauses in any of the groups of clauses, wherein the account server is configured to recognize the request as being associated with a card-present session based on specification of the user-specified PIN at the SIS.

Clause 7. The computer-implemented method according to any of the clauses in any of the groups of clauses, wherein the SIS includes a pin entry device (PED) that facilitates specification of a personal identification number by a customer, wherein communication of the session identifying information, receiving of the account information, and communication of the request are performed by the PED.

Clause 8. The computer-implemented method according to any of the clauses in any of the groups of clauses, further comprising subsequent to communicating the session identifying information to the mobile device, entering a "waiting" state in which further session processing by the SIS is prevented, and after receiving an indication that the value amount was transferred from the first account specified by the account information to the second account associated with the account server, entering a "pending new session" in which further session processing by the SIS is allowed.

Clause 9. The computer-implemented method according to any of the clauses in any of the groups of clauses, further comprising; communicating a PIN associated with the account information to the SIS, wherein the SIS communicates the request responsive to a match being determined between the user-specified PIN and the PIN associated with the account information.

Clause 10. A system comprising a memory that stores instruction code; and a processor in communication with the memory, wherein the instruction code is executable by the processor to cause the processor to perform the method of any of the preceding clauses.

Clause 11. A non-transitory computer-readable medium having stored thereon instruction code, wherein the instruction code is executable by a processor of a computer to perform the method of any of the preceding clauses.

What is claimed is:

1. A method for reducing a time to authenticate a user during a session, the method performed by a session initiation system (SIS), a mobile device, an intermediate gateway, an account server, and an authentication server, the method comprising:
   outputting, at a display of the SIS, a matrix barcode readable by the mobile device while in proximity to the SIS;
   scanning, by the mobile device, the matrix barcode;
   decoding, by the mobile device, session information encoded within the matrix barcode;
   communicating, by the mobile device to the authentication server, the session information and information regarding a first account;
   determining, by the authentication server based on the session information, a communication mode associated with the intermediate gateway that facilitates network communications between the authentication server and the intermediate gateway;
   communicating, from the authentication server to the intermediate gateway via the communication mode, information regarding the first account and at least a portion of the session information;
   receiving, at the SIS from the intermediate gateway, the information regarding the first account and at least the portion of the session information;
   communicating, to the intermediate gateway from the SIS, a first payment request that specifies the information regarding the first account and a value amount; and
   in response to receiving the first payment request, the intermediate gateway communicating to the account server a second payment request including the information regarding the first account, the value amount, and information regarding a second account, wherein the account server is configured to transfer the value amount from the first account to the second account.

2. The method according to claim 1, wherein the session information specifies an SIS identifier that uniquely identifies the SIS.

3. The method according to claim 2, further comprising encoding the session information in the matrix barcode.

4. The method according to claim 3, further comprising generating the matrix barcode at a time of the session, and encoding the value amount in the matrix barcode.

5. The method according to claim 3, wherein:
the matrix barcode is a static image that is associated with the SIS, and
the mobile device is configured to specify the value amount in the session information.

6. The method according to claim 1, wherein the account server is configured to recognize the second payment request as being associated with a card-present transaction.

7. The method according to claim 1, wherein:
the SIS includes a pin entry device (PED) that facilitates entry of a personal identification number by the user,
the session information includes the personal identification number, and
the authentication server communicates to the intermediate gateway an indication that the personal identification number is sufficient to have the session considered as a card-present session.

8. The method according to claim 1, further comprising:
subsequent to outputting the matrix barcode, the SIS entering a "waiting" state in which further session processing by the SIS is prevented; and
after receiving approval information, the SIS entering a "pending new session" state in which further session processing by the SIS is allowed.

9. The method of claim 1, wherein the intermediate gateway determines the information regarding the second account based on a merchant identifier or an identifier of the SIS contained within at least the portion of the session information.

10. The method of claim 1, wherein the communication mode specifies:
Internet and a uniform resource locator (URL) and/or an Internet Protocol (IP) address associated with the SIS, or
Plain Ordinary Telephone Service (POTS) and a phone number associated with the SIS.

11. The method of claim 1, wherein:
communicating the session information includes the mobile device communicating a physical address of the mobile device,
the session information received at the SIS from the authentication server indicate the physical address of the mobile device, and
the method further comprises the SIS confirming a physical address of the SIS matches the physical address of the mobile device indicated by the session information received at the SIS from the authentication server.

12. The method of claim 2, wherein the SIS identifier includes a MAC address, a uniform resource locator (URL), an Internet Protocol (IP) address, or a phone number.

13. The method of claim 1, wherein the account server is configured to determine an issuing bank from the information regarding the first account and request a transfer of funds from the issuing bank.

14. A system comprising:
a session initiation system (SIS);
a mobile device;
an intermediate gateway;
an account server;
an authentication server;
memory within the SIS, the mobile device, the intermediate gateway, and the authentication server, the memory storing instruction code; and
processors in communication with the memory, wherein the instruction code is executable by the processors to perform operations comprising:
outputting, at a display of the SIS, a matrix barcode readable by the mobile device while in proximity to the SIS;
scanning, by the mobile device, the matrix barcode;
decoding, by the mobile device, session information encoded within the matrix barcode;
communicating, by the mobile device to the authentication server, the session information and information regarding a first account;
determining, by the authentication server based on the session information, a communication mode associated with the intermediate gateway that facilitates network communications between the authentication server and the intermediate gateway;
communicating, from the authentication server to the intermediate gateway via the communication mode, information regarding the first account and at least a portion of the session information;
receiving, at the SIS from the intermediate gateway, the information regarding the first account and at least the portion of the session information;
communicating, to the intermediate gateway from the SIS, a first payment request that specifies the information regarding the first account and a value amount; and
in response to receiving the first payment request, the intermediate gateway communicating to the account server a second payment request including the information regarding the first account, the value amount, and information regarding a second account, wherein the account server is configured to transfer the value amount from the first account to the second account.

15. The system according to claim 14, wherein:
the session information specifies an SIS identifier that uniquely identifies the SIS, and
the instruction code is executable by the processors to perform further operations comprising encoding the session information in the matrix barcode.

16. The system according to claim 15, wherein the instruction code is executable by the processors to perform further operations comprising generating the matrix barcode at a time of a session corresponding to the session information, and encoding the value amount in the matrix barcode.

17. The system according to claim 15, wherein:
the matrix barcode is a static image that is associated with the SIS, and
the mobile device is configured to specify the value amount in the session information.

18. The system according to claim 14, wherein the account server is configured to recognize the second payment request as being associated with a card-present session.

19. The system according to claim 14, wherein:
the SIS includes a pin entry device (PED) that facilitates entry of a personal identification number by a customer,
the session information includes the personal identification number, and
the authentication server is configured to communicate to the intermediate gateway an indication that the personal identification number is sufficient to have a session corresponding to the session information considered as a card-present session.

20. Non-transitory computer-readable memory having stored thereon instruction code, wherein the instruction code is executable by processors of a system comprising a session initiation system (SIS), a mobile device, an intermediate gateway, an account server, and authentication server to perform operations comprising:

outputting, at a display of the SIS, a matrix barcode readable by the mobile device while in proximity to the SIS;

scanning, by the mobile device, the matrix barcode;

decoding, by the mobile device, session information encoded within the matrix barcode;

communicating, by the mobile device to the authentication server, the session information and information regarding a first account;

determining, by the authentication server based on the session information, a communication mode associated with the intermediate gateway that facilitates network communications between the authentication server and the intermediate gateway;

communicating, from the authentication server to the intermediate gateway via the communication mode, information regarding the first account and at least a portion of the session information;

receiving, at the SIS from the intermediate gateway, the information regarding the first account and at least the portion of the session information;

communicating, to the intermediate gateway from the SIS, a first payment request that specifies the information regarding the first account and a value amount; and in response to receiving the first payment request, the intermediate gateway communicating to the account server a second payment request including the information regarding the first account, the value amount, and information regarding a second account, and the account server is configured to transfer the value amount from the first account to the second account.

* * * * *

UNITED STATES PATENT AND TRADEMARK OFFICE
CERTIFICATE OF CORRECTION

PATENT NO. : 12,333,540 B2
APPLICATION NO. : 17/756350
DATED : June 17, 2025
INVENTOR(S) : Brett Andrew White Page 1 of 1

It is certified that error appears in the above-identified patent and that said Letters Patent is hereby corrected as shown below:

In the Claims

Claim 20, Column 30, Line 66 should read:
gateway, an account server, and an authentication server to Signed and Sealed this
Twenty-second Day of July, 2025

Coke Morgan Stewart
*Acting Director of the United States Patent and Trademark Office*